United States Patent
Tomi

(10) Patent No.: US 9,442,551 B2
(45) Date of Patent: Sep. 13, 2016

(54) INFORMATION PROCESSING APPARATUS, CONTROL METHOD FOR THE SAME AND STORAGE MEDIUM

(71) Applicant: CANON KABUSHIKI KAISHA, Tokyo (JP)

(72) Inventor: Hideyasu Tomi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 268 days.

(21) Appl. No.: 14/044,394

(22) Filed: Oct. 2, 2013

(65) Prior Publication Data
US 2014/0108841 A1    Apr. 17, 2014

(30) Foreign Application Priority Data
Oct. 12, 2012 (JP) .................. 2012-227425

(51) Int. Cl.
G06F 1/32  (2006.01)
G06F 1/20  (2006.01)

(52) U.S. Cl.
CPC ............. *G06F 1/3203* (2013.01); *G06F 1/206* (2013.01); *G06F 1/3206* (2013.01); *G06F 1/3275* (2013.01); *G06F 1/3215* (2013.01); *Y02B 60/1228* (2013.01); *Y02B 60/1275* (2013.01)

(58) Field of Classification Search
CPC ................................................... G06F 1/3203
USPC ....................................................... 713/323
See application file for complete search history.

(56) References Cited

U.S. PATENT DOCUMENTS

| | | | | |
|---|---|---|---|---|
| 7,404,096 | B2* | 7/2008 | Chung | 713/323 |
| 9,148,910 | B1* | 9/2015 | Mimran | G01R 31/2856 |
| 2001/0043530 | A1* | 11/2001 | Nakatsuka et al. | 369/53.1 |
| 2004/0123172 | A1* | 6/2004 | Sheller | G06F 1/3203 713/323 |
| 2006/0159156 | A1* | 7/2006 | Lee | G01K 7/42 374/183 |
| 2006/0174149 | A1* | 8/2006 | Hottelet et al. | 713/324 |
| 2007/0286004 | A1* | 12/2007 | Kim et al. | 365/212 |
| 2008/0040562 | A1* | 2/2008 | Gower et al. | 711/154 |
| 2008/0103634 | A1* | 5/2008 | Santos | G05D 23/19 700/299 |

(Continued)

FOREIGN PATENT DOCUMENTS

JP    2012-160086 A    8/2012

OTHER PUBLICATIONS

Chinese office action issued in corresponding application No. 201310475654.5 on Oct. 10, 2015.

*Primary Examiner* — Thomas Lee
*Assistant Examiner* — Volvick Derose
(74) *Attorney, Agent, or Firm* — Carter, DeLuca, Farell & Schmidt, LLP

(57) ABSTRACT

An information processing apparatus according to an aspect of this invention includes a wide IO memory device stacked on an SoC die that includes a CPU, detects the temperatures of multiple memories included in the wide IO memory device, and when transitioning to a power saving mode, specifies a memory with a lower temperature, based on the detected temperatures, as the memory to be used with priority in the power saving mode, and stores information for returning from the power saving mode to a normal mode in the specified memory.

17 Claims, 17 Drawing Sheets

(56) References Cited

U.S. PATENT DOCUMENTS

| | | | |
|---|---|---|---|
| 2009/0009235 A1* | 1/2009 | Yamamoto | G11C 5/14 327/512 |
| 2009/0112503 A1* | 4/2009 | Hattis | G01K 3/14 702/99 |
| 2010/0037073 A1* | 2/2010 | Huizenga | G06F 1/3203 713/320 |
| 2010/0157709 A1* | 6/2010 | Kim | G11C 5/143 365/212 |
| 2011/0173474 A1* | 7/2011 | Salsbery et al. | 713/323 |
| 2011/0219203 A1* | 9/2011 | Nurminen | G11C 7/04 711/165 |
| 2012/0018885 A1 | 1/2012 | Lee et al. | |
| 2012/0216057 A1* | 8/2012 | Huizenga et al. | 713/320 |
| 2013/0275665 A1* | 10/2013 | Saraswat | G11C 7/04 711/106 |
| 2014/0108841 A1* | 4/2014 | Tomi | G06F 1/206 713/323 |

* cited by examiner

| TEMPERATURE SENSOR NAME | TEMPERATURE INFORMATION |
|---|---|
| TEMPERATURE SENSOR 309 | 50°C |
| TEMPERATURE SENSOR 310 | 60°C |
| TEMPERATURE SENSOR 311 | 65°C |
| TEMPERATURE SENSOR 312 | 70°C |

FIG. 12A

| SDRAM 301<br><br>AREA<br>A | SDRAM 302<br><br>AREA<br>B |
|---|---|
| SDRAM 304<br><br>AREA<br>D | SDRAM 303<br><br>AREA<br>C |

FIG. 12B

| A1 | A2 | A3 | B1 | B2 | B3 |
|---|---|---|---|---|---|
| A4 | A5 | A6 | B4 | B5 | B6 |
| A7 | A8 | A9 | B7 | B8 | B9 |
| D1 | D2 | D3 | C1 | C2 | C3 |
| D4 | D5 | D6 | C4 | C5 | C6 |
| D7 | D8 | D9 | C7 | C8 | C9 |

FIG. 13

| AREA | FUNCTIONAL BLOCK | HEAT GENERATION AMOUNT |
|---|---|---|
| A1 | RIP 111 | 2 |
| A2 | DISPLAY CONTROLLER 1102 | 1 |
| A3 | SATA CONTROLLER 1104 | 1 |
| A4 | RIP 111 | 3 |
| A5 | RIP 111 | 2 |
| A6 | CPU 101 | 1 |
| A7 | RIP 111 | 2 |
| A8 | EDITING IMAGE PROCESSING UNIT 110 | 2 |
| A9 | WIDE IO CONTROLLER 112 | 2 |
| B1 | CPU 101 | 2 |
| B2 | CPU 101 | 2 |
| B3 | MODEM 104 | 1 |
| B4 | CPU 101 | 3 |
| B5 | CPU 101 | 3 |
| B6 | NETWORK I/F 103 | 2 |
| B7 | WIDE IO CONTROLLER 112 | 2 |
| B8 | PRINTING IMAGE PROCESSING UNIT 109 | 2 |
| B9 | NETWORK I/F 103 | 1 |
| C1 | PRINTING IMAGE PROCESSING UNIT 109 | 2 |
| C2 | PRINTING IMAGE PROCESSING UNIT 109 | 3 |
| C3 | FLASH ROM CONTROLLER 1106 | 1 |
| C4 | PRINTING IMAGE PROCESSING UNIT 109 | 3 |
| C5 | PRINTING IMAGE PROCESSING UNIT 109 | 2 |
| C6 | PRINTING IMAGE PROCESSING UNIT 109 | 1 |
| C7 | PRINTER I/F 1108 | 1 |
| C8 | PRINTER I/F 1108 | 1 |
| C9 | PRINTER I/F 1108 | 1 |
| D1 | RIP 111 | 1 |
| D2 | EDITING IMAGE PROCESSING UNIT 110 | 2 |
| D3 | SCANNING IMAGE PROCESSING UNIT 108 | 2 |
| D4 | SCANNER I/F 1107 | 1 |
| D5 | SCANNING IMAGE PROCESSING UNIT 108 | 3 |
| D6 | SCANNING IMAGE PROCESSING UNIT 108 | 2 |
| D7 | SCANNER I/F 1107 | 1 |
| D8 | SCANNER I/F 1107 | 1 |
| D9 | SCANNING IMAGE PROCESSING UNIT 108 | 1 |

F I G. 17
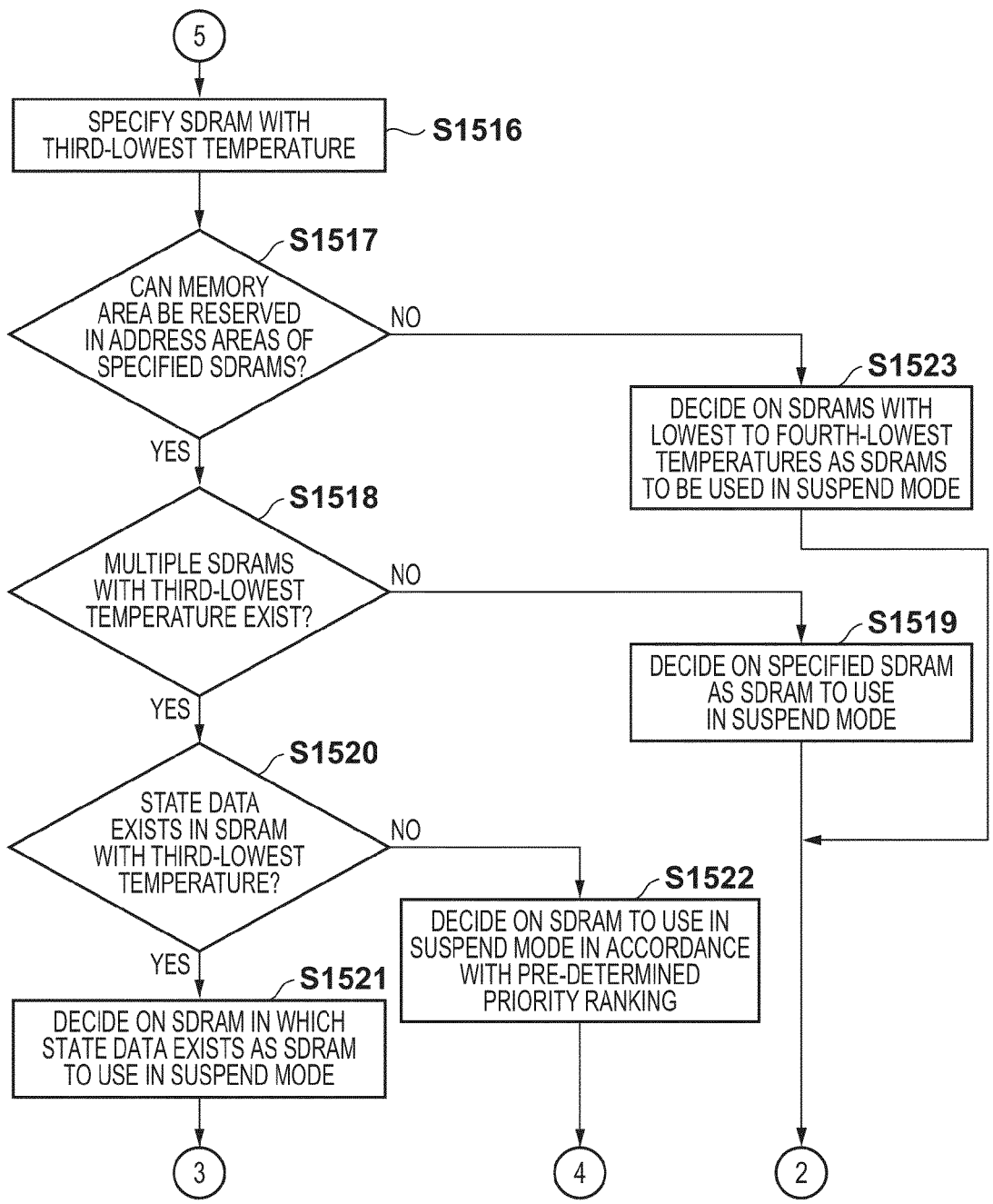

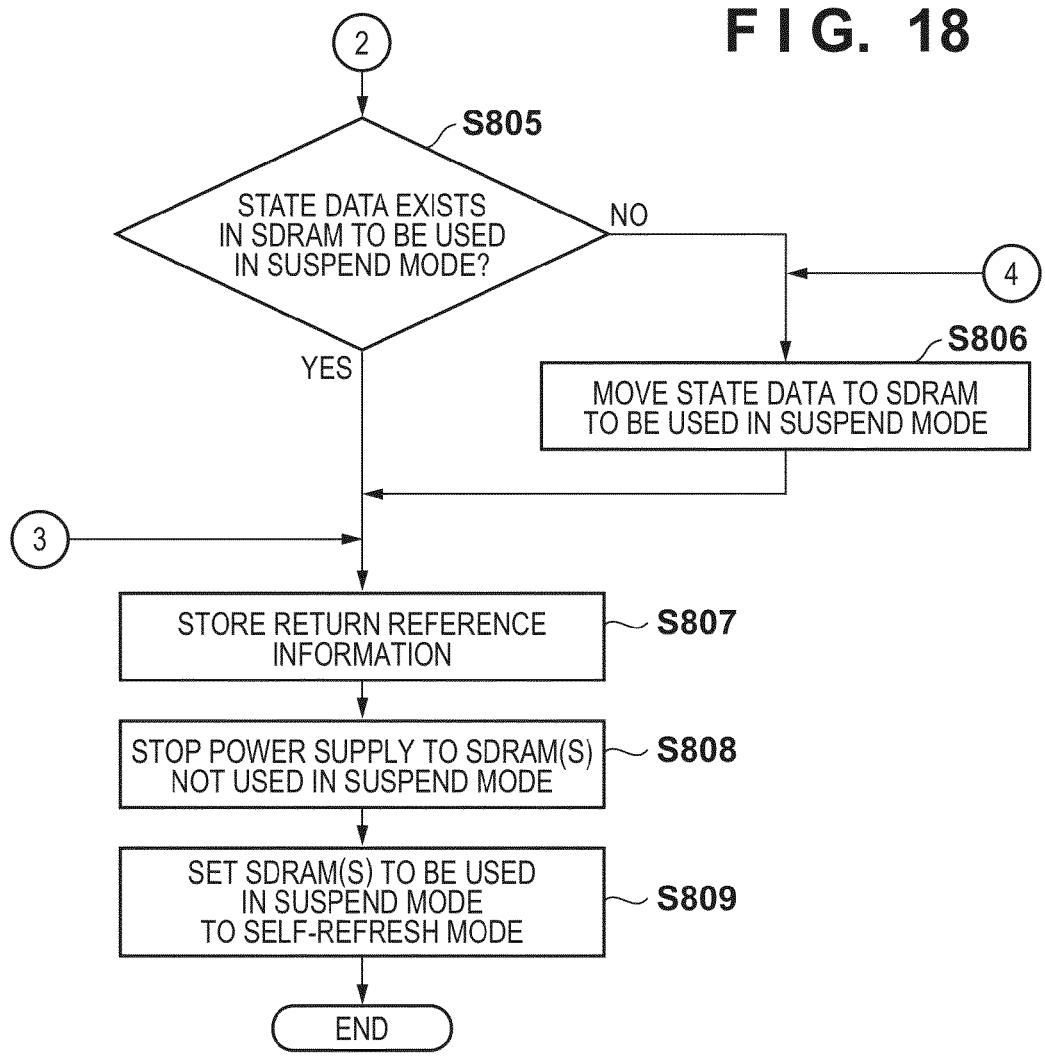

INFORMATION PROCESSING APPARATUS, CONTROL METHOD FOR THE SAME AND STORAGE MEDIUM

BACKGROUND OF THE INVENTION

1. Field of the Invention

The present invention relates to an information processing apparatus including a wide IO memory device stacked on an SoC die that includes a CPU.

2. Description of the Related Art

In information processing apparatuses that include a CPU such as a microprocessor, a DRAM is often used for storage of data for executing an OS and various applications, and for temporary storage of data for executing image processing. The DRAM is connected to a CPU, an SoC (System on a Chip), or the like and used by them. Furthermore, in recent years, as functions have been added/enhanced in information processing apparatuses, the amount of memory bandwidth needed in DRAMs has increased. Because of this, the amount of memory bandwidth has been increased by raising the clock frequency during memory access, according to a standard such as DDR3 or DDR4. Furthermore, as another method, memory bandwidth is reserved by including multiple DRAM channels that are connected to a CPU or an ASIC (Application Specific Integrated Circuit). However, a new problem occurs in that increasing the clock frequency and employing multiple memory channels increases power consumption.

In view of this, wide IOs, which are a next-generation DRAM standard, are currently gaining attention. A wide IO is configured by placing a DRAM chip over an SoC die using a 3D stacking technique based on TSVs (Through-Silicon Vias). Features of the wide IO include being able to obtain a wide bandwidth that is over 12.8 GB/s (gigabytes per second) at most, with a wide data width of 512 bits, and having low power consumption due to the access frequency being suppressed, to a low frequency. Also, by employing TSVs, the package size can be made thinner and smaller compared to a conventional PoP (Package on Package). Furthermore, as a counter-measure against heat caused by stacking memories in an SoC package, a temperature sensor that, detects the memory temperature is built, in, and the self-refresh rate is changed according to the detected temperature. Also, in this configuration, a data width of 512 bits is divided into four 128-bit channels and each channel is controlled individually. For example, a method of use is possible in which channel 1 and channel 2 are put in a self-refresh state, while channel 3 and channel 4 are used for normal memory access, or the like. A basic structure and basic access method for such a wide IO is disclosed in US2012/0018885.

On the other hand, there has been increased, demand to reduce the amount of $CO_2$ emissions in the interest of preventing global warming, as well as demand, to lower the power consumption of information processing apparatuses, exemplified by MFPs (digital multifunction devices), which have multiple functions, such as image scanning, printing, and copying. A power-saving mode has conventionally been provided in MFPs in order to achieve low power consumption. This power saving mode achieves low power consumption by stopping the supply of power to areas that do not operate during standby in a state in which processing such as printing is not performed. Additionally, a power saving mode capable of shortening the time for returning from the power saving mode to the normal mode has also been implemented. Specifically, a suspend mode is employed, which lowers the power consumption of the MFP with the below-described procedures (A) and (B).

(A) State data (register, RAM data, etc.) that indicates the operating state of the CPU, the RAM, and the like is stored in a RAM that is in a self-refresh state.

(B) The supply of power to, for example, a RAM that is not a self-refresh target, is stopped.

A return from the suspend mode to the normal mode is performed due to the CPU receiving an interrupt due to some kind of return trigger (the press of an operation panel button, or a periodic startup caused by a timer) or the like. In the case of a return to the normal mode, the return time is shortened by returning the state data that indicates the operating state of the CPU, the RAM, and the like, and that had been stored in the RAM in the self-refresh state up to that time, to the location (RAM) in which it was stored before transitioning to the suspend mode, and then resuming processing.

The stacked structure of a wide IO is structurally susceptible to heat. For example, if a specific region of a SoC die and a DRAM chip of a wide IO placed on a layer above this specific region are activated, at the same time, the temperature of the activated portions sometimes rises locally. This rise in temperature is accompanied by an exponential increase in leak current in the semiconductor and an increase in power consumption. In addition, the DRAM performs storage of data by storing charge in a capacitor included in each cell. Since the capacitors are naturally discharged by leak current in the semiconductor, it is necessary for the DRAM to charge the capacitors by performing a refresh operation, in order to preserve the stored data. The discharging of this charge depends on the temperature of the DRAM, and the higher the temperature is, the faster the discharge speed is. Accordingly, if the temperature of the DRAM becomes high, the refresh frequency needs to be increased. As a result, this invites an increase in power consumption caused by refresh operations. This causes an increase in power consumption in the suspend mode, which accounts for a large portion of the power consumption of the RAM in the self-refresh state.

SUMMARY OF THE INVENTION

In order to resolve the problems in the conventional technology, one aspect of the present invention provides a technique that further reduces power consumption in the suspend mode when using a wide IO memory.

According to one aspect of the present invention, there is provided an information processing apparatus including a wide IO memory device stacked on an SoC die that includes a CPU, the information processing apparatus comprising: a temperature detection unit configured to detect temperatures of a plurality of memories that are included in the wide IO memory device; a specification unit configured to, when the information processing apparatus is to transition to a power saving mode, specify a memory having a lower temperature among the plurality of memories, as a memory to be used with priority in the power saving mode, based on the temperatures detected by the temperature detection unit; and a storage control unit configured to store information for the information processing apparatus to return from the power saving mode to a normal mode, in the memory specified by the specification unit.

According to another aspect of the present invention, there is provided, an information processing apparatus including a wide IO memory device stacked on an SoC die that includes a CPU, the information processing apparatus comprising: a calculation unit configured to, when the information processing apparatus is to transition to a power saving mode, calculate a heat generation amount generated in the power saving mode in each of a plurality of areas that are obtained by dividing an area of the SoC die; a specification unit configured to specify a memory positioned over an area in which the heat generation amount calculated by the calculation unit is smaller out of a plurality of memories included in the wide IO memory device, as a memory to be used with priority in the power saving mode; and a storage control unit configured to store information for the information processing apparatus to return from the power saving mode to a normal mode, in the memory specified by the specification unit.

According to still another aspect of the present invention, there is provided a control method of controlling an information processing apparatus including a wide IO memory device stacked on an SoC die that includes a CPU, the method comprising steps of: detecting temperatures of a plurality of memories that are included in the wide IO memory device; specifying, when the information processing apparatus is to transition to a power saving mode, a memory having a lower temperature among the plurality of memories, as a memory to be used with priority in the power saving mode, based on the temperatures detected in the detecting step; and storing information for the information processing apparatus to return from the power saving mode to a normal mode, in the memory specified in the specifying step.

According to yet another aspect of the present invention, there is provided a control method of controlling an information processing apparatus including a wide IO memory device stacked on an SoC die that includes a CPU, the method comprising steps of: calculating, when the information processing apparatus is to transition to a power saving mode, a heat generation amount generated in the power saving mode in each of a plurality of areas that are obtained by dividing an area of the SoC die; specifying a memory positioned over an area in which the heat generation amount calculated in the calculating step is smaller out of a plurality of memories included in the wide IO memory device, as a memory to be used with priority in the power saving mode; and storing information for the information processing apparatus to return from the power saving mode to a normal mode, in the memory specified in the specifying step.

According to still yet another aspect of the present invention, there is provided a computer-readable storage medium storing a computer program for causing a computer to execute steps of a control method of controlling an information processing apparatus including a wide IO memory device stacked on an SoC die that includes a CPU, the method comprising steps of: detecting temperatures of a plurality of memories that are included in the wide IO memory device; specifying, when the information processing apparatus is to transition to a power saving mode, a memory having a lower temperature among the plurality of memories, as a memory to be used with priority in the power saving mode, based on the temperatures detected in the detecting step; and storing information for the information processing apparatus to return from the power saving mode to a normal mode, in the memory specified in the specifying step.

According to yet still another aspect of the present invention, there is provided a computer-readable storage medium storing a computer program for causing a computer to execute steps of a control method of controlling an information processing apparatus including a wide IO memory device stacked on an SoC die that includes a CPU, the method comprising steps of: calculating, when the information processing apparatus is to transition to a power saving mode, a heat generation amount generated in the power saving mode in each of a plurality of areas that, are obtained by dividing an area of the SoC die; specifying a memory positioned over an area in which the heat generation amount calculated in the calculating step is smaller out of a plurality of memories included in the wide IO memory device, as a memory to be used with priority in the power saving mode; and storing information for the information processing apparatus to return from the power saving mode to a normal mode, in the memory specified in the specifying step.

According to an aspect of the present invention, it is possible to reduce the memory refresh frequency and leak current by performing control so as to transition to a power saving mode using a memory having a lower temperature among memories in a wide IO. This enables the reduction of power consumption in a wide IO memory device that is in the power saving mode.

Further features of the present invention will become apparent from the following description of exemplary embodiments (with reference to the attached drawings).

BRIEF DESCRIPTION OF THE DRAWINGS

FIG. 12A is a diagram showing the relationship between SDRAMs that configure the wide IO SDRAM and areas of the SoC die.

FIG. 12B is a diagram showing the positional relationship of areas in the case where the areas of the SoC die have been divided into 6×6 areas.

FIG. 13 is a diagram for describing a table indicating where the blocks of the MFP according to the second embodiment are allocated in the divided areas of the SoC die shown in FIG. 12B, as well as the heat generation amount when each activated, in relative values.

FIG. 17 is a flowchart for describing processing for deciding on an SDRAM to use in the case where the CPU of the MFP according to the third embodiment causes the MFP to transition to the suspend mode.

FIG. 18 is a flowchart for describing processing for deciding on an SDRAM to use in the case where the CPU of the MFP according to the third embodiment causes the MFP to transition to the suspend mode.

FIG. 19 is a diagram showing examples of temperature information detected by temperature sensors in a third embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

An MFP (digital multi-function device) having multiple functions such as scanning, printing, and copying will be described in the embodiments below as an example of an information processing apparatus to which the present invention applies.

First Embodiment

Figure 1:
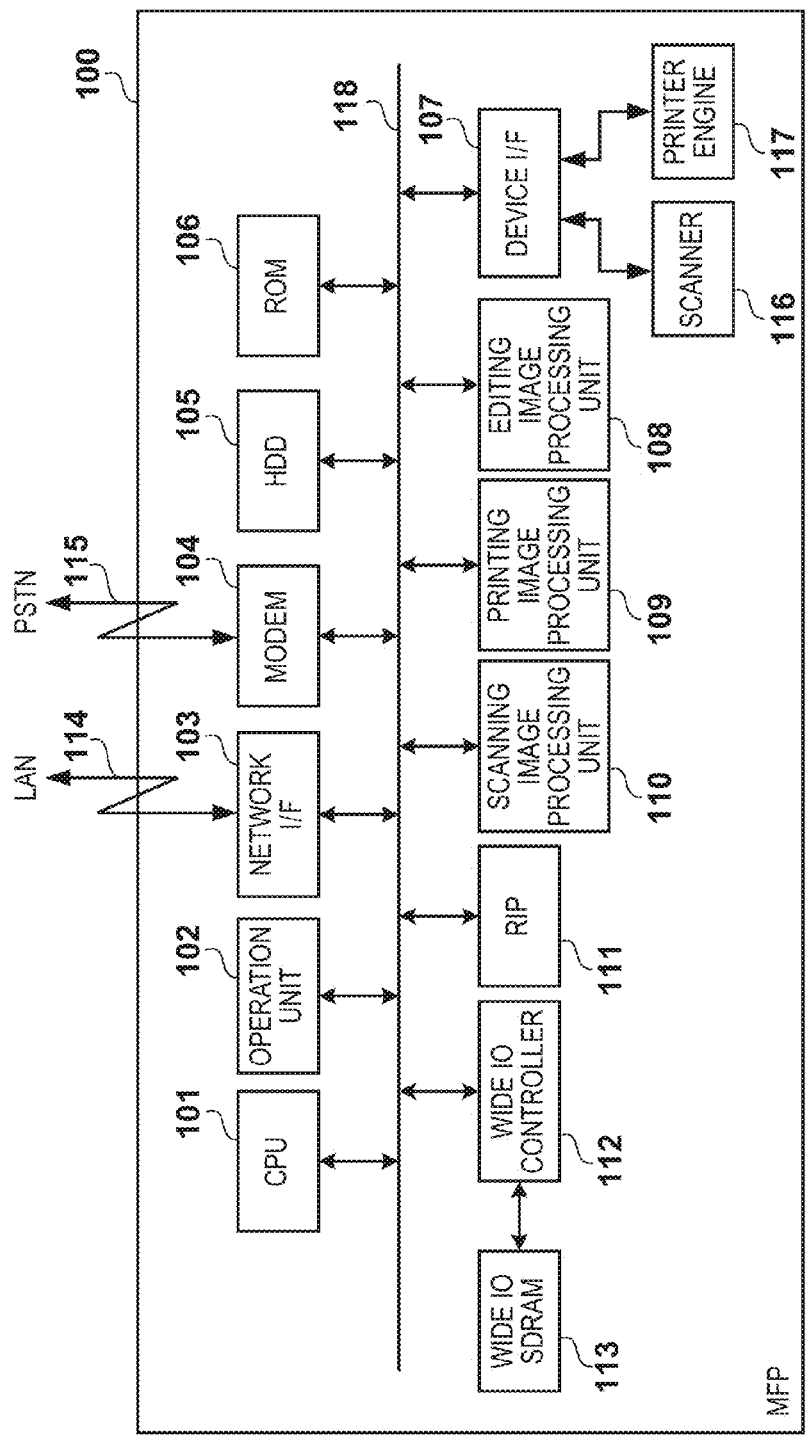
FIG. 1 is a block diagram showing an overall configuration of an MFP (a digital multifunction device) according to a first embodiment of the present invention.

FIG. 1 is a block diagram showing an overall configuration of an MFP (a digital multi-function device) according to the present embodiment.

An MFP 100 has a scanner 116 that is an image input device, and a printer engine 117 that is an image output device, and these are connected to a system bus 118 via a device interface (I/F) 107. The MFP 100 can perform scanning of an original image using the scanner 116, and printing using the printer engine 117, under control of the CPU 101. Also, the MFP 100 is connected to a LAN 114 and a public switched telephone network (PSTN) 115, and can input and output image data and device information regarding an external device connected to the LAN or the PSTN via the LAN 114 and the PSTN 115.

A CPU 101 controls the operation of this MFP 100 by executing a program loaded from, an HDD 105 to a wide IO SDRAM 113 by a boot program stored in a ROM 106. An operation unit 102 has an input unit such as a touch panel or a keyboard, and a display unit, and receives instructions from a user, and causes the display unit to display messages, processing results, and the like to the user. The network I/F 103 is realized by a LAN card for example, and performs input/output of device information and image data with external devices via the LAN 114. A modem 104 performs input/output, of control information and image data with external devices via the PSTN 115. The HDD (hard disk drive) 105 stores an OS, various application programs, and the like, and holds input image data and the like. The ROM 106 stores a boot program and various data. The device I/F 107 is connected to the printer engine 117 and the scanner 116, and performs processing for image data transmission with the scanner 116, the printer engine 117, and the system bus 118.

The editing image processing unit 108 performs, on image data, various types of image processing, such as rotation and size adjustment, color processing, trimming/masking, binary conversion, multi-value conversion, and blank sheet determination. The printing image processing unit 109 performs image processing and the like that corresponds to the printer engine 117 on image data to be output to the printer engine 117. The scanning image processing unit 110 performs various types of processing such as correcting, manipulating, and editing on image data input from the scanner 116. The Raster Image Processor (RIP) 111 renders page description language (PDL) code into image data.

A wide IO controller 112 converts memory access commands from the CPU 101, the image processing units 108 to 110, and the like into commands that are interpretable by the wide IO SDRAM 113 and accesses the wide IO SDRAM 113. The wide IO SDRAM 113 stores programs to be executed by the CPU 101, and provides a system working memory for the CPU 101 to operate. Additionally, the wide IO-SDRAM 113 is also an image memory for temporarily storing input image data. As shown in FIG. 1, the system bus 118 connects the aforementioned devices and the CPU 101, and transfers control signals, data, and the like therebetween.

Figure 2A:
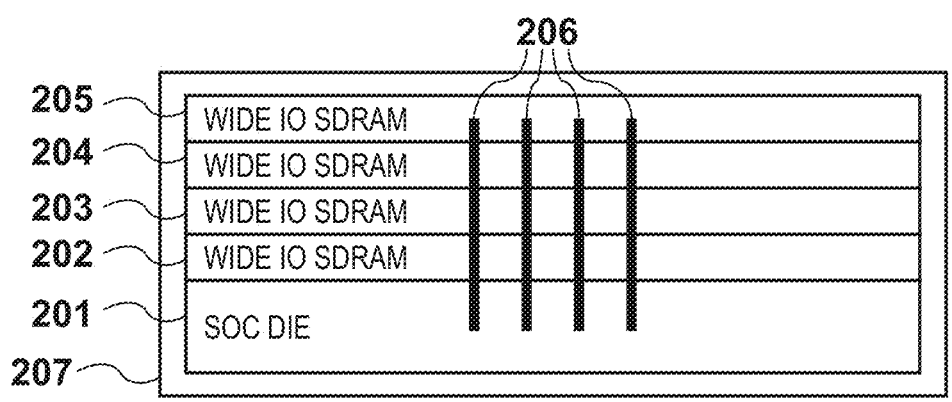
FIGS. 2A and 2B are pattern diagrams showing the structure of a wide IO SDRAM according to the first embodiment.
Figure 2B:
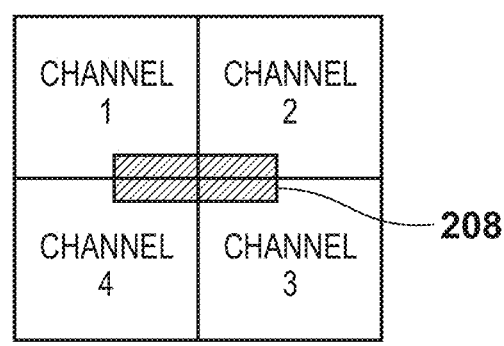

FIGS. 2A and 2B are pattern diagrams showing the structure of the wide IO SDRAM 113 according to the present embodiment, FIG. 2A being a side view of the wide IO SDRAM and an SoC die viewed from the side, and FIG. 2B being a top view.

In the present embodiment, an SoC die 201 includes the CPU 101, the device I/F 107, the RIP 111, the image processing units 108 to 110, and the like. Wide IO SDRAM chips 202 to 205 are stacked over the SoC die 201 and connected to the SoC die 201 by a Through-Silicon Via (TSV) 206. The wide IO SDRAM chips can be stacked, in four layers at most, according to the necessary memory capacity, and an example of stacking in four layers is shown in FIG. 2A. An SoC package 207 contains the SoC die 201 and the wide IO SDRAM chips 202 to 205 in one package. As shown in FIG. 2B, the wide IO SDRAM I/F 208 is arranged in the central portion of the SoC die 201 and the wide IO SDRAM chips 202 to 205.

Figure 3:
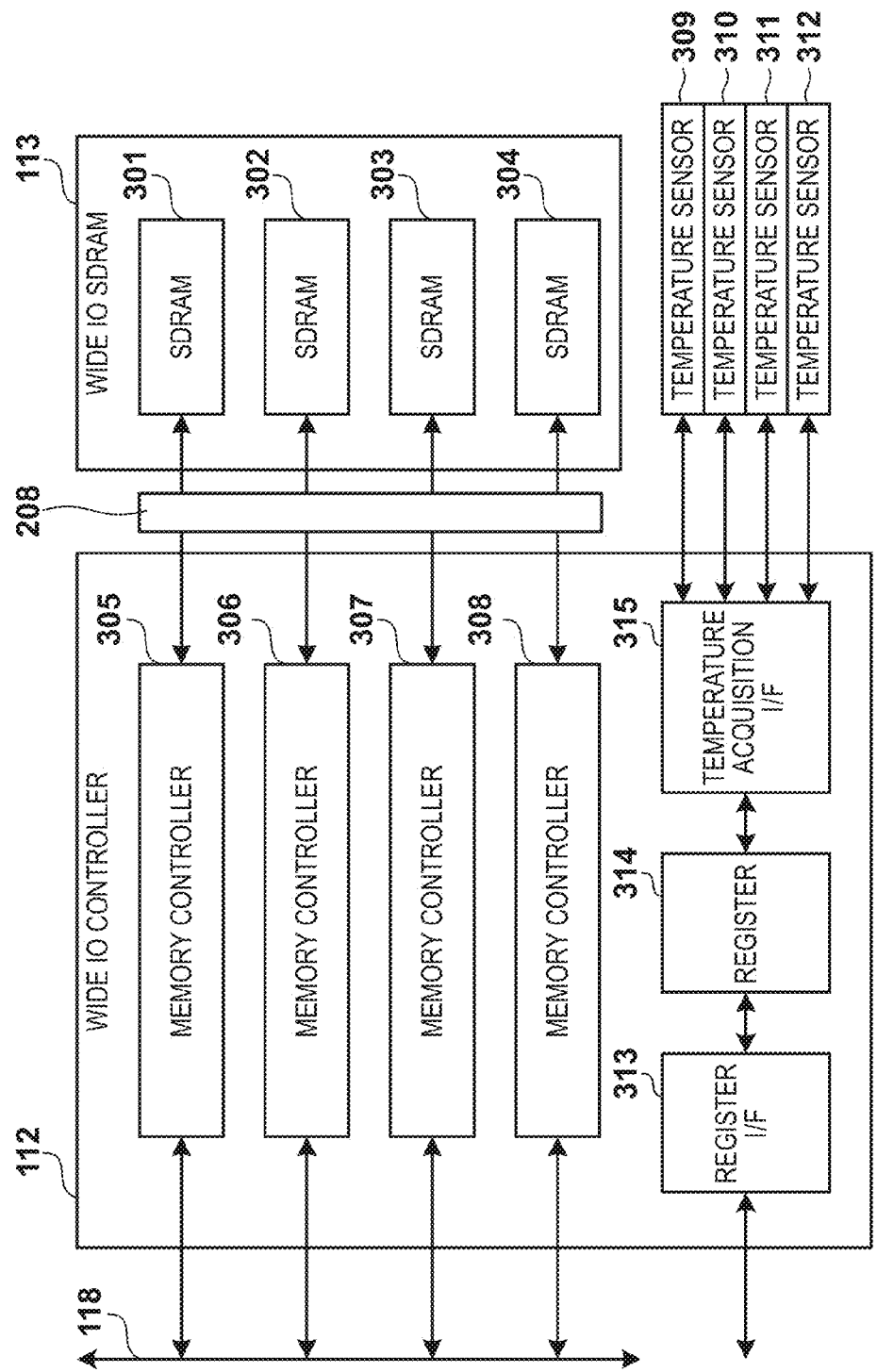
FIG. 3 is a block diagram showing the internal configuration of a wide IO controller according to the first embodiment.

FIG. 3 is a block diagram showing the internal configuration of the wide IO controller 112 according to the present embodiment.

In FIG. 3, the wide IO controller 112 is connected between the system bus 118 and the wide IO SDRAM 113, as shown in FIG. 1. The wide IO controller 112 is connected to temperature sensors 309 to 312, which are not illustrated in FIG. 1.

SDRAMs 301 to 304 are four memories provided in the wide IO SDRAM 113, and each includes a dedicated interface (I/F) as shown in FIG. 3. The dedicated I/Fs correspond to the four channels of the wide IO SDRAM chips 202 to 205, which are stacked over the SoC die 201 as described above. Also, the dedicated I/Fs correspond to the wide IO SDRAM I/F 208 in FIG. 2B. The memory controllers 305 to 308 can individually control power supply voltage, as well as the supply and termination of clock signals, for the SDRAMs 301 to 304. Each of the memory controllers 305 to 308 accesses a corresponding connected SDRAM by converting a memory access command from the system bus 118 into a command that is interpretable by the SDRAM. The temperature sensors 309 to 312 measure the temperature of the corresponding SDRAM out of the SDRAMs 301 to 304.

Figure 4:
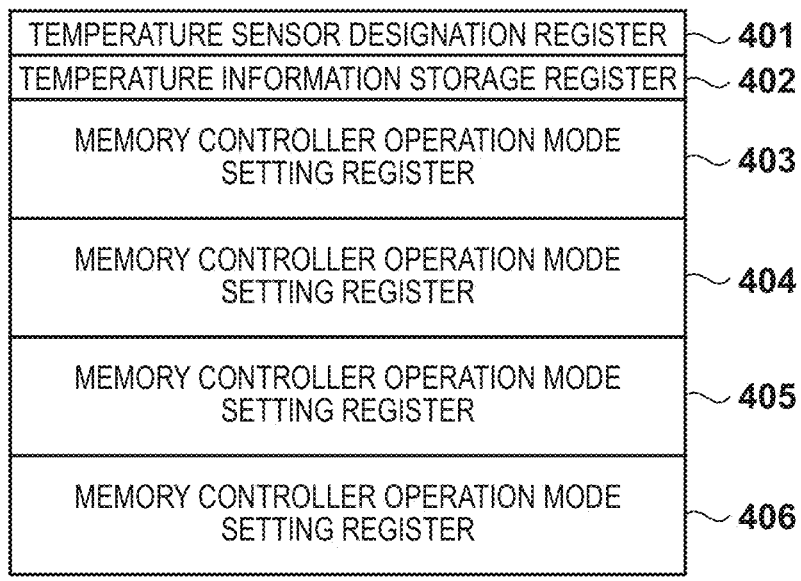
FIG. 4 is a diagram for describing a configuration of a register according to the first embodiment.

A register I/F 313 receives access from the CPU 101 via a register-dedicated bus (not shown). A register 314 stores temperature information acquired by the temperature acquisition I/F 315 from the temperature sensors 309 to 312, as well as operation mode setting information for the memory controllers 305 to 308, which is set by the CPU 101. If the temperature acquisition I/F 315 detects a temperature information acquisition request from a temperature information storage register 402 (FIG. 4), which will be described later, the temperature acquisition I/F 315 issues a command for acquiring the temperature information to the temperature sensor designated by a later-described temperature sensor designation register 401 (FIG. 4). Thus, the temperature acquisition I/F 315 acquires the temperature information from the corresponding temperature sensor. The temperature acquisition I/F 315 stores the acquired temperature information to the temperature information storage register 402 (described later).

FIG. 4 is a diagram for describing the configuration of the register 314 according to the present embodiment.

The register 314 has the temperature sensor designation register 401, the temperature information storage register 402, and memory controller operation mode setting registers 403 to 406. The temperature sensor designation register 401 is a register that stores information for designating a temperature sensor to be the target when the CPU 101 is to acquire the temperature information of a temperature sensor. Since the present embodiment will be described using an example in which four temperature sensors are provided, it can be configured by a two-bit register, and can specify each of the four temperature sensors by the states of the two bits.

When a temperature information acquisition request from the CPU 101 is input, the temperature information storage register 402 makes a request to the temperature acquisition I/F 315 to acquire the temperature information of the temperature sensor designated by the temperature sensor designation register 401. Also, the temperature information storage register 402 stores temperature information acquired from the temperature acquisition I/F 315, and outputs the temperature information stored therein in accordance with a temperature information readout request from the CPU 101.

Figures 9, 10:
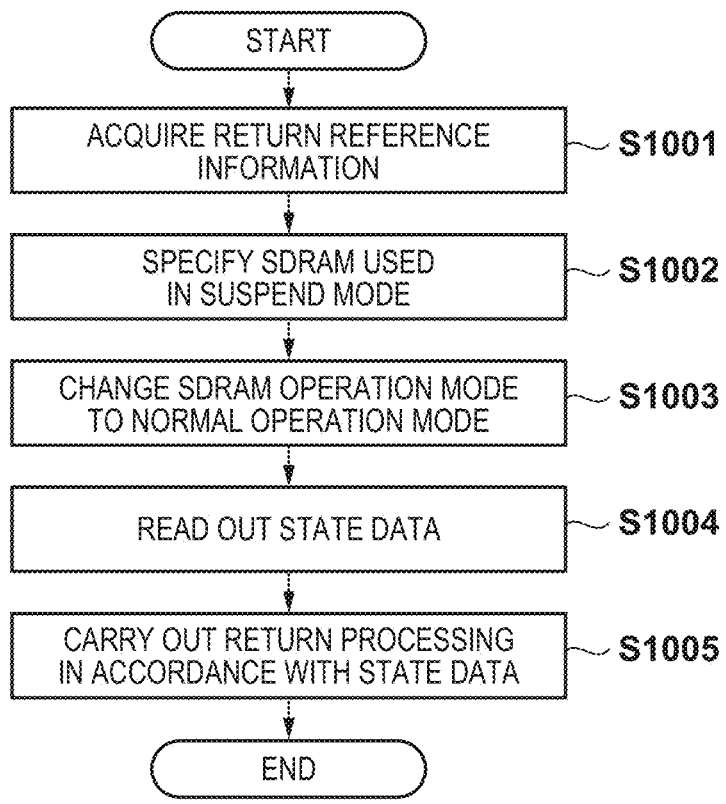
FIG. 9 is a diagram showing examples of temperature information detected by the temperature sensors in the first embodiment.
FIG. 10 is a flowchart for describing processing in the case where the CPU of the MFP according to the first embodiment causes the MFP to return from the suspend mode to the normal mode.

FIG. 9 is a diagram showing an example of temperature information that indicates the temperature of the SDRAMs 301 to 304 acquired from the temperature sensors 309 to 312 in the present embodiment. FIG. 9 shows that the SDRAM 304, which corresponds to memory channel 4 and whose temperature was measured by the temperature sensor 312, has the highest temperature, while the SDRAM 301, which corresponds to memory channel 1 and whose temperature was measured by the temperature sensor 309, has the lowest temperature.

The memory controller operation mode setting registers 403 to 406 are registers for setting the operation modes of the memory controllers 305 to 308 respectively. The memory controller operation mode setting registers 403 to 406 respectively store setting values related to memory control for the SDRAMs 301 to 304. Here, examples of setting values related to memory control include time intervals of refresh operations for the SDRAMs 301 to 304, timing parameters related to memory access, and the like. Note that the memory controller operation mode setting registers 403 sets the operation mode of the memory controller 305, and the memory controller operation mode setting registers 404 sets the operation mode of the memory controller 306. Also, the memory controller operation mode setting registers 405 sets the operation mode of the memory controller 307, and the memory controller operation mode setting registers 406 sets the operation mode of the memory controller 308.

Figure 5:
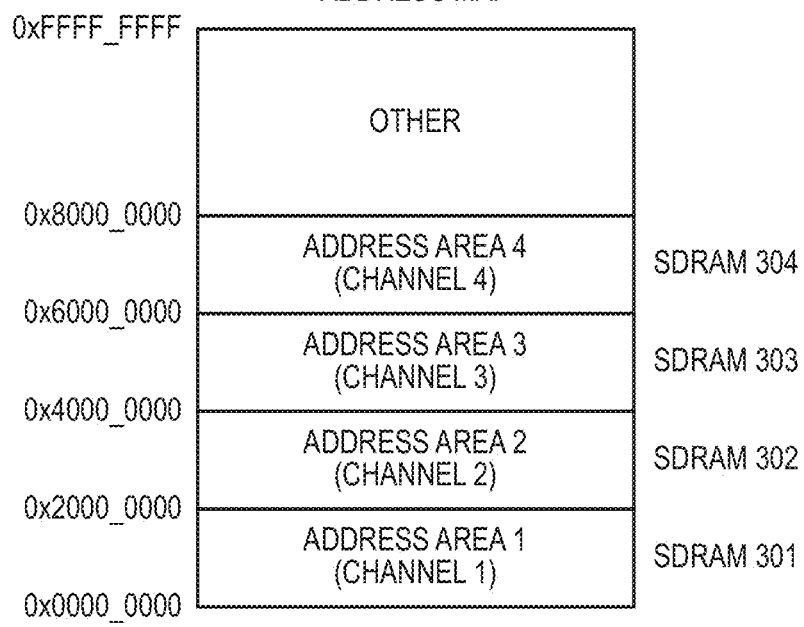
FIG. 5 is a diagram for describing an address map showing address areas allocated to an SDRAM according to the first embodiment.

FIG. 5 is a diagram for describing an address map indicating address areas allocated to the SDRAMs 301 to 304, according to the present embodiment.

In the present embodiment, an address area 1 is allocated to the SDRAM 301, an address area 2 is allocated to the SDRAM 302, an address area 3 is allocated to the SDRAM 303, and an address area 4 is allocated to the SDRAM 304. However, the sizes of the address areas are not limited to those illustrated in FIG. 5. Note that the aforementioned program of the CPU 101 is loaded to the address area 1 in the SDRAM 301.

Figure 6:
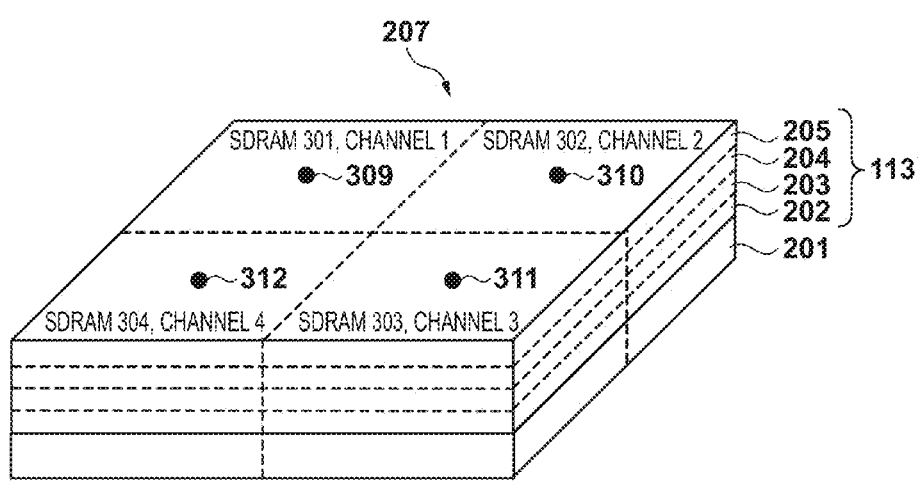
FIG. 6 is an overhead view of an SoC package according to the first embodiment.

FIG. 6 is an overhead view of the SoC package 207 for simplifying the description of the physical positional relationships of the wide IO SDRAM chips 202 to 205 and the SoC die 201 in FIGS. 2A and 2B.

The SoC die 201 includes the CPU 101, the device I/F 107, the RIP 111, the aforementioned image processing units 108 to 110, and the like. The channels (memory channels) 1 to 4 in FIG. 2B correspond to the upper left, upper right, bottom left, and bottom right portions of the plane of the SoC package 207. Also, the four portions similarly correspond to the SDRAMs 301 to 304 in FIG. 3. As described above, the wide IO SDRAM 113 is a memory stacked over the SoC die 201. Additionally, in the present embodiment, the devices in the SDRAMs 301 to 304 are stacked in four layers above the four portions of the SoC die 201, as shown in FIG. 6. The temperature sensors 309 to 312 are built into the devices in the SDRAMs 301 to 304 so that the internal temperature of each memory can be measured. However, this is merely an example, and the arrangement of the SDRAMs and the temperature sensors is not limited to FIG. 6. Also, the temperature sensors 309 to 312 may be provided within the SoC die 201, or they may be provided within the memory of the wide IO SDRAM 113.

Figure 7:
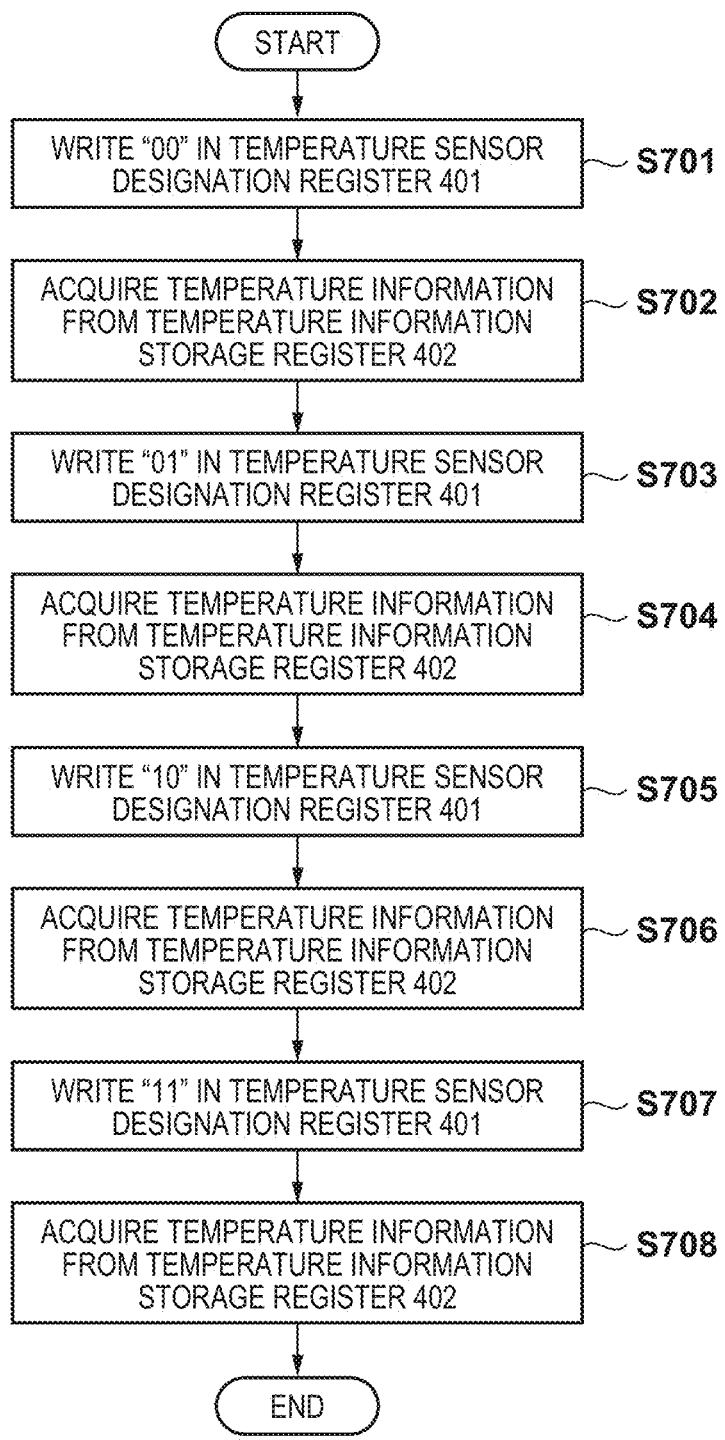
FIG. 7 is a flowchart for describing processing performed by a CPU to acquire temperature information indicating temperatures measured with temperature sensors in the MFP according to the first embodiment.

FIG. 7 is a flowchart showing a procedure of processing performed by the CPU 101 to acquire temperature information indicating the temperatures of the SDRAMs 301 to 304 measured by the temperature sensors 309 to 312 in the MFP 100 according to the present embodiment. Since the MFP 100 includes four temperature sensors in the present embodiment, the flowchart in FIG. 7 shows processing for acquiring temperature information from the four temperature sensors 309 to 312. Note that the program for executing this processing is installed in advance on the HDD 105. This processing is realized in the MFP 100 by the CPU 101 loading the program from the HDD 105 to the SDRAM 301 and executing the loaded program.

First, in step S701, the CPU 101 writes "00" in the temperature sensor designation register 401. In the present embodiment, the SoC package 207 includes four temperature sensors. Because of this, the CPU 101 associates the temperature sensors with setting values in the temperature sensor designation register 401 in the following manner in order to designate the temperature sensors. That is to say, the values in the temperature sensor designation register 401, namely "00", "01", "10", and "11", are associated with the temperature sensors 309 to 312, respectively. Thus, in step S701, the CPU 101 writes "00" in the temperature sensor designation register 401 in order to designate the temperature sensor 309.

Next, moving to step S702, the CPU 101 issues a temperature information readout request to the temperature information storage register 402 and acquires temperature information indicating the temperature of the SDRAM 301, which was measured by the temperature sensor 309. Here, as described above, upon detecting the readout request from the CPU 101, the temperature information storage register 402 acquires temperature information from the temperature sensor designated by the temperature sensor designation register 401. Moreover, the temperature information storage register 402 outputs the acquired temperature information to the CPU 101 as response data in response to the readout request from the CPU 101. Thus, the CPU 101 acquires the temperature information from the temperature sensor 309 in step S702.

Next, moving to step S703, the CPU 101 writes "01" in the temperature sensor designation register 401 in order to acquire temperature information indicating the temperature of the SDRAM 302, which was measured by the temperature sensor 310. Subsequently, moving to step S704, the CPU 101 issues a temperature information readout request to the temperature information storage register 402 and acquires the temperature information from the temperature sensor 310.

Next, moving to step S705, the CPU 101 writes "10" in the temperature sensor designation register 401 in order to acquire temperature information indicating the temperature of the SDRAM 303, which was measured by the temperature sensor 311. Subsequently, moving to step S706, the CPU 101 issues a temperature information readout request to the temperature information storage register 402 and acquires the temperature information from the temperature sensor 311.

Next, moving to step S707, the CPU 101 writes "11" in the temperature sensor designation register 401 in order to acquire temperature information indicating the temperature of the SDRAM 304, which was measured by the temperature sensor 312. Subsequently, moving to step S708, the CPU 101 issues a temperature information readout request to the temperature information storage register 402 and acquires the temperature information from the temperature sensor 312.

According to the above-described processing, the CPU 101 can acquire temperature information indicating the temperatures of the respective SDRAMs or the channels, which were measured by the respective temperature sensors.

Figure 8A:
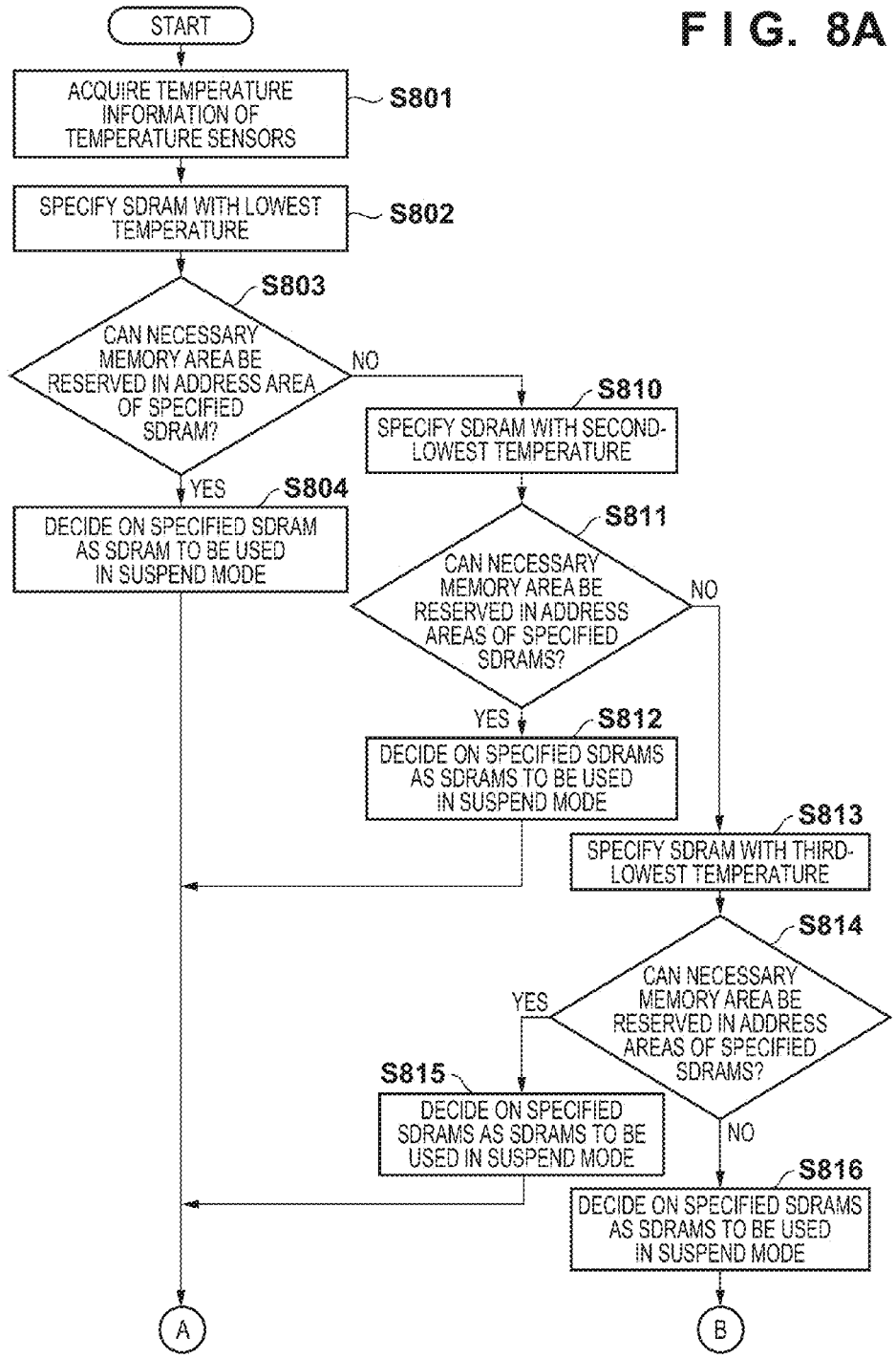
FIGS. 8A and 8B are flowcharts for describing processing for deciding on an SDRAM to use in suspend mode, in the case where the CPU causes the MFP to transition to the suspend mode in the MFP according to the first embodiment.
Figure 8B:
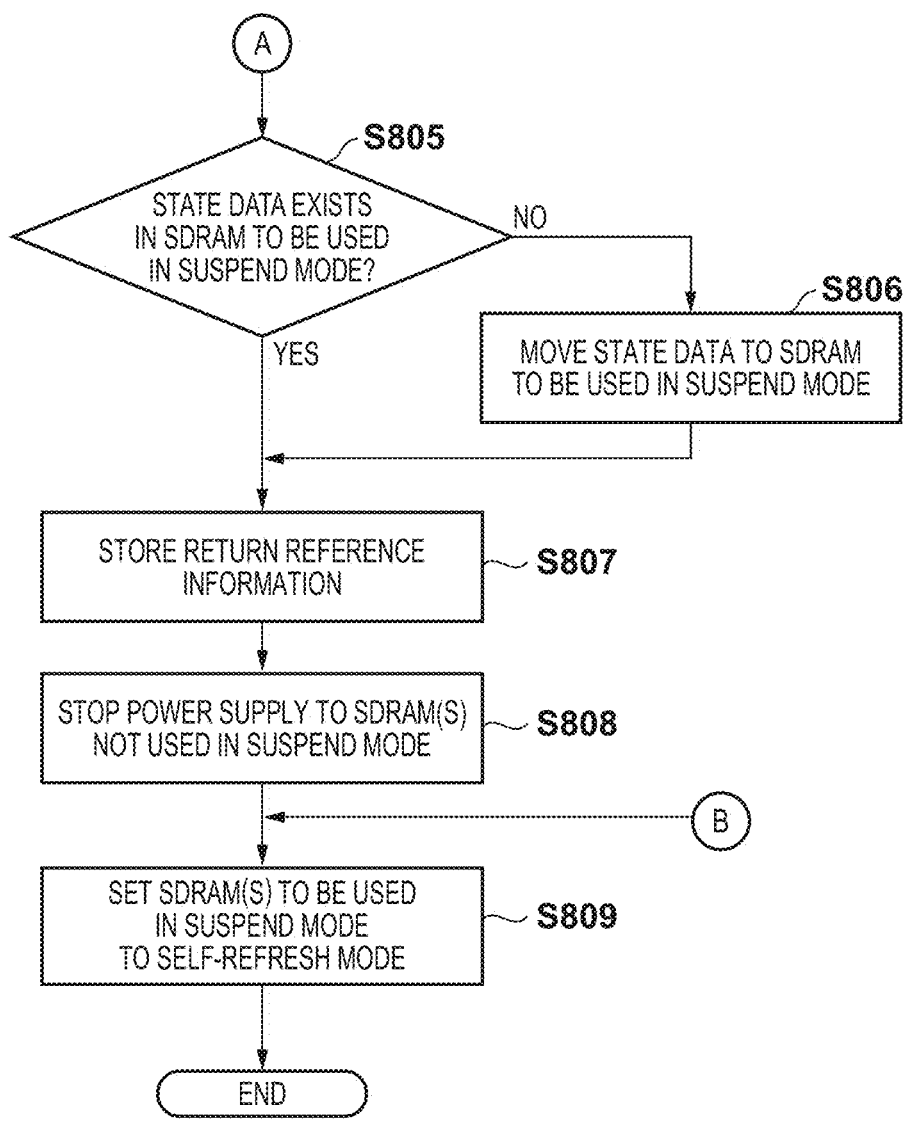

FIGS. 8A and 8B are flowcharts for describing processing for deciding on an SDRAM to use in the suspend mode (power saving mode), in the case where the CPU 101 causes the MFP 100 to transition to the suspend mode, in the MFP 100 according to the first embodiment. That is to say, this flowchart is executed at a time that is after the CPU 101 receives a trigger for transitioning to the suspend mode, and before the transition to the suspend mode. Examples of the trigger for transitioning to the suspend mode include an instruction from the operation unit 102 and an instruction from the network I/F 103. The CPU 101 reads a program loaded to the wide IO SDRAM 113 and executes the processes shown in these flowcharts in FIGS. 8A and 8B.

First, in step S801, the CPU 101 acquires the temperature information detected by the temperature sensors 309 to 312. The acquisition of the temperature information is performed in accordance with the processing shown in the flowchart in FIG. 7. In the present embodiment, which will be described below, it is assumed that the acquired temperature information includes values such as those shown in FIG. 9. That is to say, the temperature detected by the temperature sensor 309 is 50° C., the temperature detected by the temperature sensor 310 is 60° C., the temperature detected by the temperature sensor 311 is 65° C., and the temperature detected by the temperature sensor 312 is 70° C.

Next, moving to step S802, the CPU 101 specifies the SDRAM with the lowest temperature based on the temperature information acquired in step S801. In the present embodiment, as shown in FIG. 9, the lowest temperature in the temperature information acquired in step S801 is 50° C., which was detected by the temperature sensor 309. Accordingly, the SDRAM 301 can be specified as the SDRAM with the lowest temperature.

Next, moving to step S803, the CPU 101 determines whether or not a memory area capable of storing the state data can be reserved in the address area of the SDRAM with the lowest temperature, which was specified in step S802. That is to say, the CPU 101 determines whether or not the memory area needed for the state data can be reserved in the area having the addresses 0x0000_0000 to 0x2000_0000 allocated to the SDRAM 301. In step S803, if it is determined that the memory area can be reserved, the procedure moves to step S804. In step S804, the CPU 101 decides on the SDRAM with the lowest temperature as the SDRAM to be used in the suspend mode by reserving the necessary memory area in the address area of the SDRAM specified in step S802, and the procedure moves to step S805.

Next, in step S805, the CPU 101 determines whether or not the state data already exists in the SDRAM to be used in the suspend mode. If it exists, the procedure moves to step S807, and if it does not exist, the procedure moves to step S806, the CPU 101 performs storage control to move the state data to the SDRAM to be used in the suspend mode, and then the procedure moves to step S807. At this time, even if the state data is dispersed across multiple SDRAMs, the state data is similarly moved. In step S807, the CPU 101 stores information indicating the SDRAM to be used in the suspend mode and information regarding the address at which the state data is stored (hereinafter referred to as "return reference information") in the HDD 105. Next, moving to step S808, the CPU 101 stops the supply of power to SDRAMs that are not to be used in the suspend mode. Then, moving to step S809, the CPU 101 changes the operation mode of the SDRAM to be used in the suspend mode to the self-refresh state. Specifically, the CPU 101 sets a value that signifies self-refresh, in the necessary register among the memory controller operation mode setting registers 403 to 406 in FIG. 4. Thus, the corresponding memory controller among the memory controllers 305 to 308 changes the operation mode of the corresponding SDRAM to the self-refresh state. Note that if the operation modes of multiple SDRAMs need to be changed to the self-refresh state at this time, they may be changed at the same time, or they may be changed at a set time interval.

On the other hand, in step S803, if the CPU 101 determines that a memory area capable of storing the state data cannot be reserved in the address area of the SDRAM specified in step S802, the procedure moves to step S810. In step S810, the CPU 101 specifies the SDRAM having the second-lowest temperature based on the temperature information acquired in step S801. In the present embodiment, the second-lowest temperature according to FIG. 9 is 60° C., which was detected by the temperature sensor 310. Thus, the SDRAM 302 can be specified as the SDRAM having the second-lowest temperature. Then, moving to step S811, the CPU 101 determines whether or not a memory area capable of storing the state data can be reserved in the address areas of the SDRAMs having the lowest and second-lowest temperatures, which were specified in steps S802 and S810. That is to say, the CPU 101 determines whether or not the memory area needed for the state data can be reserved in the areas with the addresses 0x0000_0000 to 0x4000_0000 allocated to the SDRAMs 301 and 302. If the CPU 101 determines that the memory area can be reserved in step S811, the procedure moves to step S812, and the CPU 101 reserves the necessary memory area in the address areas of the SDRAMs having the lowest and second-lowest temperatures. Then, the SDRAMs having the lowest and second-lowest temperatures are decided on as the SDRAMs to be used in the suspend mode, and the procedure moves to step S805.

On the other hand, in the step S811, if the CPU 101 determines that the necessary memory area cannot be reserved in the SDRAMs having the lowest and second-lowest temperatures, the procedure moves to step S813, and the CPU 101 specifies the SDRAM having the third-lowest temperature based on the temperature information acquired in step S801. In the present embodiment, the third-lowest temperature in FIG. 9 is 65° C., which was detected by the temperature sensor 311. Thus, the SDRAM 303 can be specified as the SDRAM having the third-lowest temperature. Next, moving to step S814, the CPU 101 determines whether or not a memory area capable of storing the state data can be reserved, in the address areas of the SDRAMs having the lowest to third-lowest temperatures, which were specified, in steps S802, S810, and S813. That is to say, the CPU 101 determines whether or not the memory area needed for the state data can be reserved, in the areas with the addresses 0x0000_0000 to 0x6000_0000 allocated, to the SDRAMs 301, 302, and 303. If the CPU 101 determines that the memory area can be reserved, the procedure moves to step S815, and the CPU 101 reserves the necessary memory area in the address areas of the SDRAMs having the lowest to third-lowest temperatures, and thus decides on the SDRAMs having the lowest to third-lowest temperatures as the SDRAMs to be used in the suspend mode, and the procedure moves to step S805.

On the other hand, in step S814, if the CPU 101 determines that the memory area needed for the state data cannot be reserved, the procedure moves to step S816. In step S816, the CPU 101 reserves the memory area needed for the state data in the address areas allocated to the SDRAMs 301 to 304 that have the lowest to fourth-lowest temperatures, and thus decides on the SDRAMs to be used in the suspend mode, and the procedure moves to step S809. Here, the areas allocated to the SDRAMs 301 to 304 are the areas with the addresses 0x0000_0000 to 0x8000_0000.

According to the present embodiment as described above, the address area of the SDRAM having the lowest temperature in the wide IO memory device is decided, on as the address area that is to be used, with priority in the suspend mode. Thus, an advantage of being able to reduce the influence of memory temperature increases in the suspend mode is obtained.

FIG. 10 is a flowchart for describing processing in the case where the CPU 101 in the MFP 100 according to the first embodiment causes the MFP 100 to return from the suspend mode to the normal mode. This processing is executed at a time that is after the CPU 101 receives a trigger for returning to the normal mode, and before the return to the normal mode. Examples of triggers to return to the normal mode include an instruction from the operation unit 102 and the reception of a job from the network I/F 103. The CPU 101 loads a program stored in the ROM 106 and executes the processing shown in the flowchart in FIG. 10, and the CPU 101 reads a program loaded to the wide IO SDRAM 113 and executes the processing of step S1004.

First, in step S1001, the CPU 101 reads out and acquires the return reference information stored in the HDD 105. Next, moving to step S1002, the CPU 101 references the information that indicates the SDRAM used in the suspend mode, which is included in the return reference information read out in step S1001, and specifies the SDRAM used in the suspend mode. As described using the flowcharts in FIGS. 8A and 8B, the state data is stored in the SDRAM used in the suspend mode. Next, moving to step S1003, the CPU 101 changes the operation mode of the SDRAM used in the suspend mode to the normal operation mode. This is achieved, by setting a value that signifies the normal operation mode in the necessary register from among the memory controller operation mode setting registers 403 to 406 shown in FIG. 4. Thus, the memory controllers 305 to 308 change the operation mode of the corresponding SDRAM to the normal operation mode. Note that if the operation modes of multiple SDRAMs need to be changed to the normal mode, they may be changed at the same time, or they may be changed at a set time interval.

Next, moving to step S1004, the CPU 101 references the information regarding the addresses at which the state data is stored, which is included in the return reference information, and reads out the state data from the SDRAM. Then, moving to step S1005, the CPU 101 completes the return operation by performing the processing necessary for the return to the normal mode with reference to the state data. Note that the processing necessary for the return includes writing the values stored in the state data in a register for indicating the CPU state included in the CPU 101, as well as pre-processing for resuming a program that was being executed by the CPU 101 before the transition to the suspend mode.

According to the present embodiment as described above, a memory area for storing state data is reserved with priority given to the address area in an SDRAM with a low temperature, in the case where the MFP 100 transitions to the suspend mode. Because of this, it is possible to prevent further temperature increases in SDRAMs with high temperatures, and therefore power consumption can be reduced, and the length of time for returning to the normal mode can be shortened.

Second Embodiment

A second embodiment of the present invention will be described next. In the second embodiment, an area with a small heat generation amount, which is to be used in the suspend mode, is calculated using the layout information and heat generation amount information in the areas of the SoC die 201 shown in FIG. 13. Then, the memory area is allocated such that the use of the wide IO SDRAM above that area is prioritized. The following description focuses on the differences between the present embodiment and the above-described first embodiment. Note that the configuration of the MFP 100 according to the second embodiment is the same as that of the above-described first embodiment, and therefore the description thereof will not be repeated.

Figure 11:
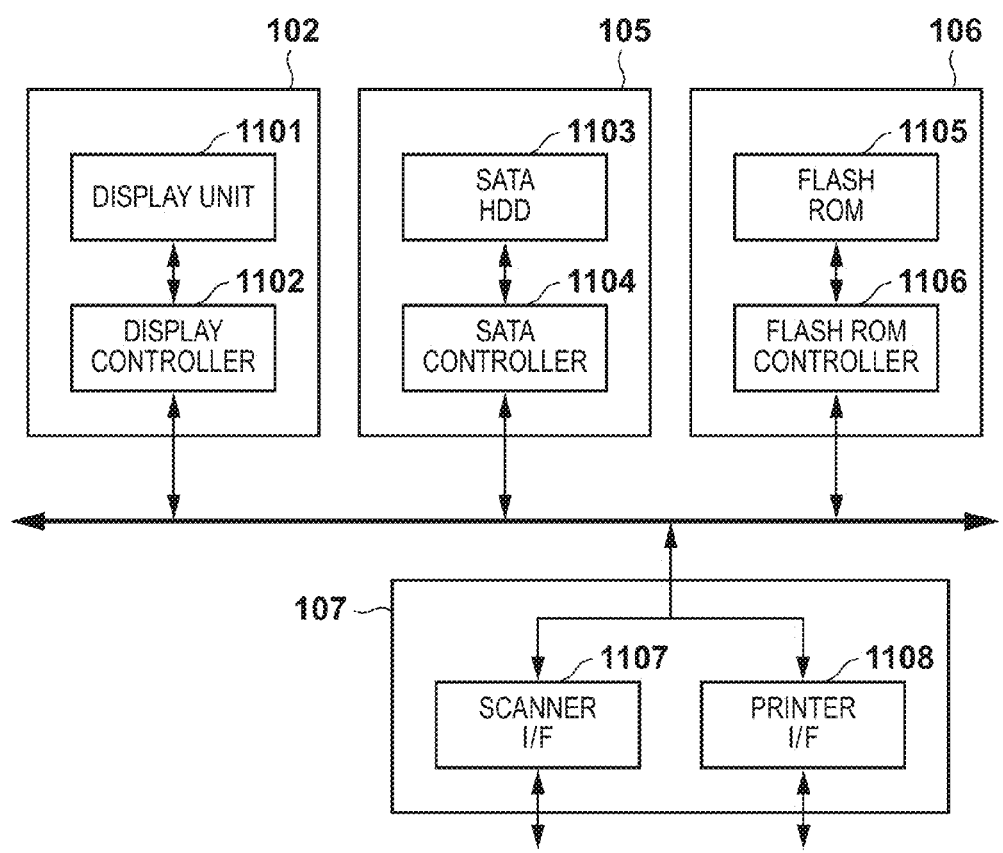
FIG. 11 is a block diagram showing a detailed configuration of an operation unit, a HDD, a ROM, and a device I/F of an MFP according to a second embodiment of the present invention.

FIG. 11 is a block diagram showing the detailed configuration of the operation unit 102, the HDD 105, the ROM 106, and the device I/F 107 of the MFP 100 according to the second embodiment of the present invention. The operation unit 102, the HDD 105, and the ROM 106 each include various types of general-purpose I/F controllers, such as a display controller 1102, an SATA controller 1104, and a flash ROM controller 1106. A display unit 1101, an SATA HDD 1103, a flash ROM 1105, and the like, which are examples of general-purpose devices controlled by the aforementioned general purpose I/F controllers 1102, 1104, and 1106, are similarly included. Also, a scanner I/F 1107 and a printer I/F 1108 are included in the device I/F 107, which exchanges control signals and image data with the scanner 116 and the printer engine 117.

FIG. 12A is a diagram showing the relationship between the SDRAMs 301 to 304 that configure the wide IO SDRAM 113, and the areas in the SoC die 201, and FIG. 12B is a diagram showing the positional relationship of the areas in the case where the area of the SoC die 201 is divided into 6×6 areas. The SDRAMs 301 to 304 are stacked over four areas of the SoC die 201, as described above, and the areas are areas A to D, as shown in FIG. 12A. Also, each of the areas A to D is further divided into 3×3 areas, and these divided areas are A1 to A9, B1 to B9, C1 to C9, and D1 to D9, as shown in FIG. 12B. The heat generated due to these areas being activated is transferred, to the SDRAMs 301 to 304 located above them and has a large effect on the power consumption.

FIG. 13 is a diagram for describing a table indicating where the blocks (FIG. 1) of the MFP 100 according to the second embodiment are allocated in the divided areas of the SoC die 201 shown in FIG. 12B, as well as the heat generation amount (per unit time) when each area is activated, in relative values. Here, circuits corresponding to the blocks in FIG. 1 are arranged on the SoC die 201, and the heat generation amount in each area shown in FIGS. 12A and 12B varies according to the circuits being activated.

Since the CPU 101 is laid out spanning the areas A6, B1, B2, B4, and B5 according to FIGS. 12A, 12B, and 13, if the CPU 101 is operating, these areas are activated. Accordingly, area A in FIG. 12B generates "1" unit of heat per unit of time, and area B generates "10" units of heat per unit of time. Also, since the printing image processing unit 109 is laid out spanning the areas B8, C1, C2, C4, C5, and C6, if the printing image processing unit 109 operates, these areas are activated. Accordingly, area B in FIG. 12B generates "2" units of heat per unit of time, and area C generates "11" units of heat per unit of time. The information shown in FIG. 13 is acquired in advance, during the designing of the SoC die 201, and is stored in the ROM 106 or the wide IO SDRAM 113. More specifically, information regarding the areas to which the functional blocks in FIG. 1 are allocated is obtained as the layout information during the designing of the SoC die 201. Additionally, the heat generation amount for when each area is activated is obtained using a heat simulation or the like during the designing of the SoC die 201.

Figure 14:
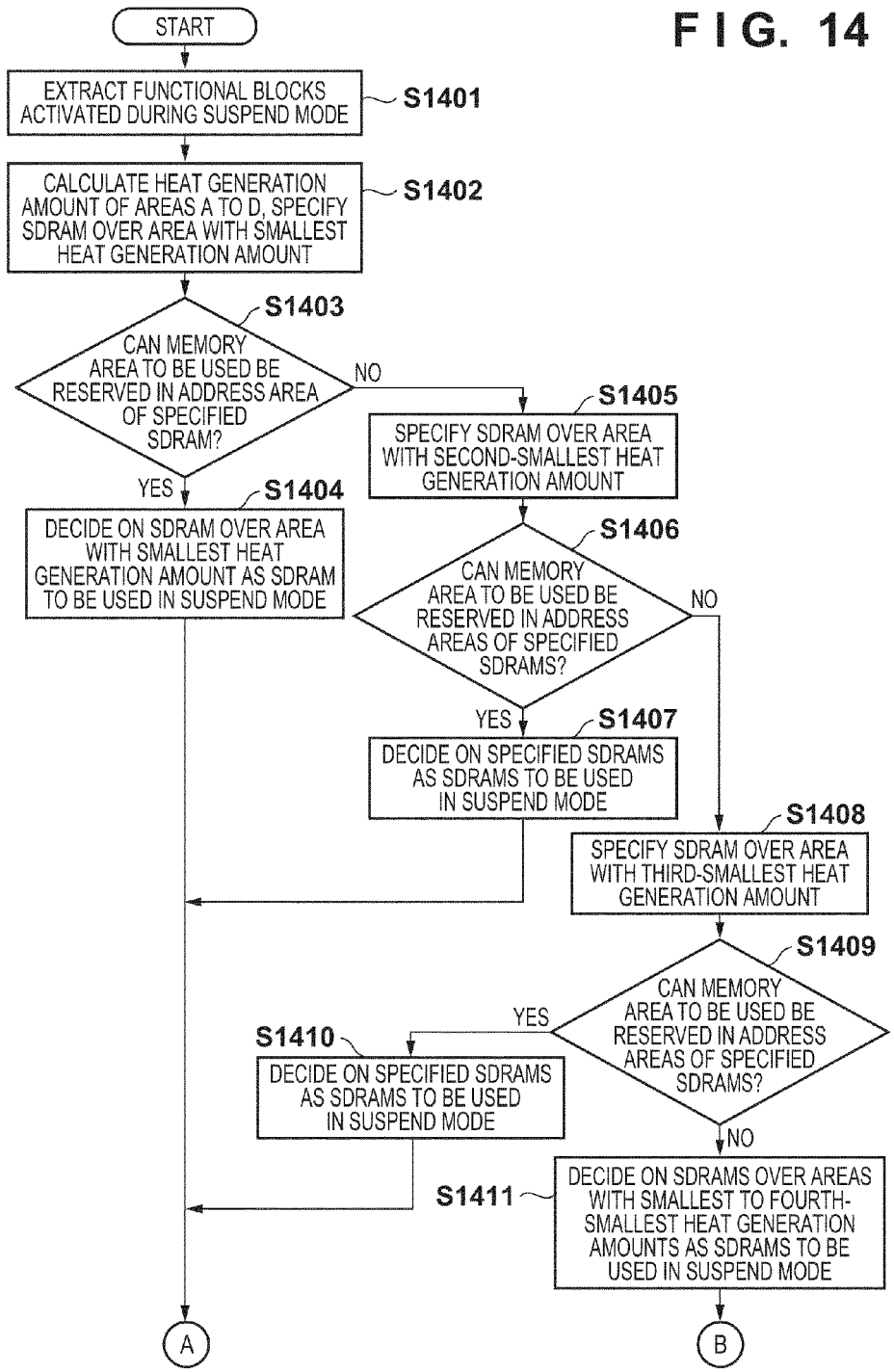
FIG. 14 is a flowchart showing processing for deciding on an SDRAM to use in the case where the CPU of the MFP according to the second embodiment causes the MFP to transition to the suspend mode.

FIG. 14 is a flowchart showing processing for deciding on an SDRAM to be used in the case where the CPU 101 in the MFP 100 according to the second embodiment causes the MFP 100 to transition to the suspend mode. In other words, this flowchart is executed at a time that is after the CPU 101 receives a trigger for transitioning to the suspend mode, and before the transition to the suspend mode. Examples of the trigger for transitioning to the suspend mode include an instruction from the operation unit 102 and an instruction from the network I/F 103. The CPU 101 reads a program loaded to the wide IO SDRAM 113 and executes the processes that will be described using the flowchart in FIG. 14.

First, in step S1401, upon receiving a trigger for transitioning to the suspend mode, the CPU 101 extracts the functional blocks to be activated when in the suspend mode. Then, moving to step S1402, the CPU 101 calculates the heat generation amounts of the areas A to D shown in FIG. 12B, based on the information regarding the extracted functional blocks, and based on the table in FIG. 13. Then, the CPU 101 specifies the SDRAM positioned above the area generating the smallest amount of heat.

Next, moving to step S1403, the CPU 101 determines whether or not a memory area capable of storing the state data can be reserved in the address area of the SDRAM that is above the area with the smallest heat generation amount, which was specified in step S1402. In other words, if the SDRAM 301 is used for example, the CPU 101 determines whether or not the memory area needed for the state data can be reserved in the area with the addresses 0x0000_0000 to 0x2000_0000. If it is determined that the memory area can be reserved, the procedure moves to step S1404, and the CPU 101 reserves the memory area needed for the state data in the address area of the SDRAM that is above the area with the smallest heat generation amount. Then, that SDRAM is decided on as the SDRAM to be used in the suspend mode. Then, the processes shown below in steps S805 to S809 are executed. Note that these processes are the same as the processes shown in FIG. 8B, and therefore the description thereof will not be repeated.

On the other hand, in step S1403, if the CPU 101 determines that the necessary memory area cannot, be reserved in the SDRAM specified in step S1402, the procedure moves to step S1405. In step S1405, the CPU 101 obtains the area with the second-smallest heat generation amount, based on the information regarding the heat generation amounts of the areas A to D, which was calculated in step S1402, and specifies the SDRAM that is above that area. Next, moving to step S1406, the CPU 101 determines whether or not the necessary memory area can be reserved in the wide IO SDRAMs above the areas with the smallest and the second-smallest heat generation amounts, which were specified in steps S1402 and S1405. In other words, if the SDRAMs 301 and 302 are used for example, it is determined whether or not the memory area needed for the state data can be reserved in the areas with the addresses 0x0000_0000 to 0x4000_0000. If it is determined that they can be reserved, the procedure moves to step S1407, and the CPU 101 reserves the necessary memory area in the address areas of the SDRAMs having the smallest and second-smallest heat, generation amounts. Then, the SDRAMs above the areas having the smallest and second-smallest heat generation amounts are decided on as the SDRAMs to be used in the suspend mode. Then, the procedure moves to step S805, and the description of the processing from S805 and onward will not be repeated.

On the other hand, in step S1406, if the CPU 101 determines that the memory area of the necessary size cannot be reserved in the SDRAMs specified in step S1405, the procedure moves to step S1408. In step S1408, the CPU 101 specifies the SDRAM that is above the area having the third-smallest heat generation amount, based on the information regarding the heat generation amounts of the areas A to D, which, were calculated in step S1402. Then, moving to step S1409, the CPU 101 determines whether or not the memory area capable of storing the state data can be reserved in the address areas of the SDRAMs that were specified in steps S1402, S1405, and S1408. In other words, in the case of the SDRAMs 301 to 303, it is determined whether or not the memory area needed for the state data can be reserved in the areas with the addresses 0x0000_0000 to 0x6000_0000. If it is determined, that the memory area can be reserved, the procedure moves to step S1410, and the CPU 101 reserves the memory area in the address areas of the SDRAMs above the areas having the smallest to third-smallest heat generation amounts. Thus, the CPU 101 decides on the SDRAMs over the areas having the smallest to third-smallest heat generation amounts as the SDRAMs to be used in the suspend mode, and the procedure moves to step S805. The description of the processing from S805 onward will not be repeated.

Additionally, in step S1409, if the CPU 101 determines that the memory area of the necessary size cannot be reserved, the procedure moves to step S1411. In step S1411, the CPU 101 reserves the memory area needed for the state data in the addresses allocated to the SDRAMs 301 to 304 above the areas having the smallest to fourth-smallest heat generation amounts, and decides on these SDRAMs as the SDRAMs to be used in the suspend mode, and then the procedure moves to step S809. Note that the description of the processing from S809 onward will not be repeated.

Next, each process will be described in detail using a specific example of the suspend mode. In the present embodiment, an example will be described in which an instruction from the network I/F 103 is used as the trigger for transitioning from the normal mode to the suspend mode.

The CPU 101, the network I/F 103, the ROM 106, and the wide IO controller 112 are the functional blocks to be used in the state after the transition to the suspend mode instructed by the network I/F 103, and in step S1401, these functional blocks are extracted. Next, in step S1402, the heat generation amounts in the areas A to D are calculated with reference to information regarding the extracted functional blocks, as well as the table in FIG. 13. When the aforementioned functional blocks are operated, the areas A6, A9, B1, B2, B4, B5, 336, B7, B9, and C3 are activated, based on the information in the table in FIG. 13. Thus, in the suspend mode to which a transition is to be performed due to the instruction from the network I/F 103, the relative amounts of heat generated in the areas A to D of the SoC die 201 are calculated as A=3, B=15, C=1, and D=0. Here, in the suspend mode to which a transition is to be performed due to the instruction from the network I/F 103, it is found that the amount of heat generated in the areas of the SoC die 201 is in the relationship: area D<area C<area A<area B. Accordingly, the CPU 101 determines whether or not a memory area can be reserved, and reserves the memory area in the order shown in steps S1403 to S1411. For example, if the SDRAM 304 for the area D can be reserved in step S1404, the CPU 101 determines whether or not the state data exists in the SDRAM 304 in step S805. If it does not exist, the procedure moves to step S806, and the CPU 101 moves the state data to the SDRAM 304. Then, in step S807, the CPU 101 stores the return reference information in the HDD 105, and in step S808, the CPU 101 subsequently stops the supply of power to the SDRAMs 301, 302, and 303. Then, moving to step S809, the CPU 101 changes the operation mode of the SDRAM 304 to the self-refresh state.

Additionally, the processing in the case where the MFP 100 returns from the suspend mode to the normal mode is the same as in the flowchart shown in FIG. 10.

According to the second embodiment as described above, the sum of the amounts of heat generated in the functional blocks that are to be activated in the suspend mode is calculated for each area of the SoC die 201. Also, the wide IO SDRAM above an area having a small heat generation amount is reserved with priority as the memory area to be used in the suspend mode. Thus, memory temperature increases can be suppressed by avoiding, as much as possible, the use of wide IO SDRAMs included in areas that are the same as areas of the SoC that generate heat, due to being activated in the suspend mode. By doing so, drastic increases in localized temperatures in the suspend mode can be prevented, and it is possible to reduce power consumption in the suspend mode, and to shorten the time needed to return to the normal mode.

Third Embodiment

Next, a third embodiment for implementing the present invention will be described. The third embodiment describes a method of deciding on a memory area in the case where the temperature and heat generation amount as described in the above first and second embodiments are the same when deciding on a memory area to be used. The description below focuses on the differences between the first embodiment and the present embodiment.

FIGS. 15 to 18 are flowcharts showing processing for deciding on an SDRAM to use in the case where the CPU 101 of the MFP 100 according to the third embodiment causes the MFP 100 to transition to the suspend mode. That is to say, this flowchart is executed at a time that is after the CPU 101 receives the trigger for transitioning to the suspend mode, and before the transition to the suspend mode. Examples of the trigger for transitioning to the suspend mode include an instruction from the operation unit 102 and an instruction from the network I/F 103. The CPU 101 reads a program loaded to the wide IO SDRAM 113 and performs the processes described in the flowcharts in FIGS. 15 to 19.

First, in step S1501, the CPU 101 acquires the temperature information detected by the temperature sensors. The acquisition of the temperature information by the CPU 101 is performed as was described using the flowchart in FIG. 7. Next, moving to step S1502, the CPU 101 specifies the SDRAM with the lowest temperature, based on the temperature information acquired in step S1501. Then, moving to step S1503, the CPU 101 determines whether or not a memory area capable of storing the state data can be reserved in the address area of the SDRAM with the lowest temperature, which was specified in step S1502. Here, if it is determined that it can be reserved, the procedure moves to step S1504, and the CPU 101 determines whether or not multiple SDRAMs have the lowest temperature. If it is determined that multiple SDRAMs do not have the lowest temperature, the procedure moves to step S1505, and the CPU 101 reserves the memory area needed for the state data in the address area of the SDRAM having the lowest temperature, and thus decides on that SDRAM as the SDRAM to be used in the suspend mode. Thereafter, the procedure moves to the processes shown in steps S805 to S809. Since these processes are the same as those described using FIG. 8B, the description thereof will not be repeated.

On the other hand, in step S1504, if the CPU 101 determines that multiple SDRAMs have the lowest temperature, the procedure moves to step S1506, and the CPU 101 determines whether or not the state data exists in an SDRAM having the lowest temperature. Here, if it is determined that it does exist, the procedure moves to step S1507, and the CPU 101 reserves the address area in the SDRAM in which the state data exists, as the memory area to be used with priority to store the state data. Thus, the SDRAM in which the state data exists is specified as the SDRAM to be used in the suspend mode. Thereafter, the procedure moves to step S807, but the description thereof will not be repeated.

In step S1506, if the CPU 101 determines that the state data does not exists in the SDRAMs having the lowest temperature, the procedure moves to step S1508. In step S1508, the CPU 101 reserves the memory areas in the multiple SDRAMs in accordance with a pre-determined priority ranking, and thus decides on the SDRAMs to be used in the suspend mode. Here, information indicating the priority ranking may be stored in the HDD 105 or the ROM 106 and acquired by the CPU 101. Thereafter, the procedure moves to step S806, and the description thereof will not be repeated.

Figure 16:
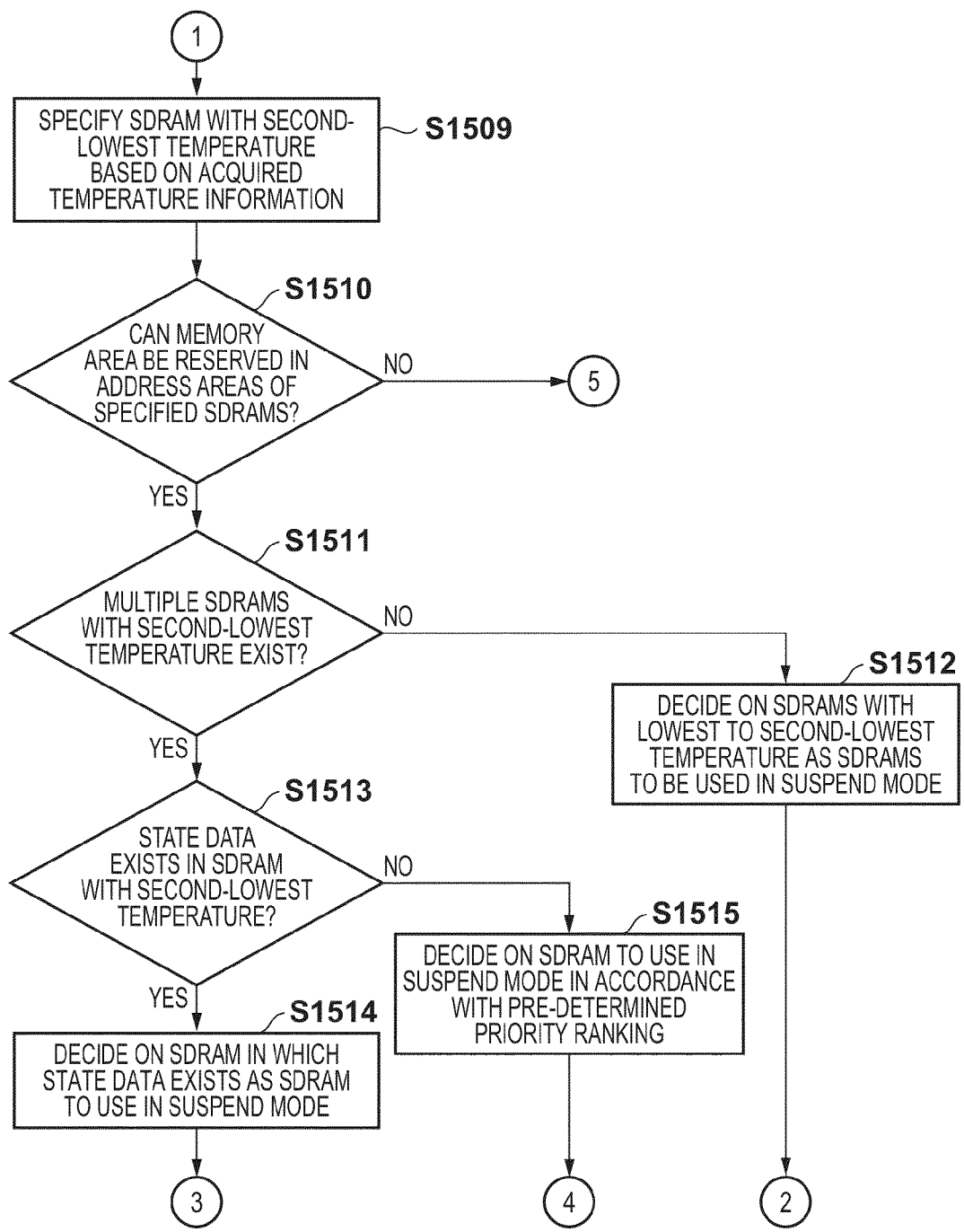
FIG. 16 is a flowchart for describing processing for deciding on an SDRAM to use in the case where the CPU of the MFP according to the third embodiment causes the MFP to transition to the suspend mode.

Next, in step S1503, if the CPU 101 determines that a memory area of the necessary size cannot be reserved in the address area allocated, to the SDRAM with the lowest temperature, which was specified in step S1502, the procedure moves to step S1509 in FIG. 16. In step S1509, the CPU 101 specifies the SDRAM with the second-lowest temperature, based on the temperature information acquired in step S1501. Next, moving to step S1510, the CPU 101 determines whether or not a memory area capable of storing the state data can be reserved in the address areas of the SDRAMs having the lowest and second-lowest temperatures, which were specified in steps S1502 and S1509. If it is determined that it can be reserved, the procedure moves to step S1511, and the CPU 101 determines whether or not multiple SDRAMs have the second-lowest temperature. If it is determined that multiple SDRAMs do not have the second-lowest temperature, the procedure moves to step S1512, and the CPU 101 reserves the memory area in the address areas of the SDRAMs having the lowest and second-lowest temperatures. Thus, the SDRAMs having the lowest and second-lowest temperatures are decided on as the SDRAMs to be used in the suspend mode. Thereafter, the procedure moves to step S805, and the description thereof will not be repeated.

On the other hand, in step S1511, if the CPU 101 determines that multiple SDRAMs have the second-lowest temperature, the procedure moves to step S1513, and the CPU 101 determines whether or not the state data exists in an SDRAM having the second-lowest temperature. Here, if it is determined that it does exist, the procedure moves to step S1514, and the CPU 101 reserves the address area of the SDRAM in which the state data exists as a memory area to be used with priority. Thus, the CPU 101 decides on the SDRAM in which the state data exists as the SDRAM to be used in the suspend mode. Thereafter, the procedure moves to step S807, and the description thereof will not be repeated.

In step S1513, if the CPU 101 determines that the state data does not exist, in the SDRAMs having the second-lowest temperature, the procedure moves to step S1515, and the CPU 101 reserves the memory area in accordance with a pre-determined priority ranking, and thus decides on the SDRAM to be used in the suspend mode. The information indicating the priority ranking may be stored in the HDD 105 or the ROM 106 and acquired by the CPU 101. Thereafter, the procedure moves to step S806, and the description thereof will not be repeated.

In step S1510, if the CPU 101 determines that the memory area cannot be reserved, the procedure moves to step S1516 in FIG. 17. In step S1516, the CPU 101 specifies the SDRAM having the third-lowest temperature, based on the temperature information acquired in step S1501. Next, moving to step S1517, the CPU 101 determines whether or not a memory area capable of storing the state data can be reserved in the address areas of the SDRAMs having the lowest to third-lowest temperatures, which were specified in steps S1502, S1509, and S1516. If it is determined that it can be reserved, the procedure moves to step S1518, and the CPU 101 determines whether or not multiple SDRAMs have the third-lowest temperature. Here, if it is determined that multiple SDRAMs do not have the third-lowest temperature, the procedure moves to step S1519. In step S1519, the CPU 101 reserves the memory area needed for the state data in the address areas of the SDRAMs having the lowest to third-lowest temperatures. Thus, the SDRAMs having the lowest to third-lowest temperatures are decided on as the SDRAMs to be used, in the suspend mode. Thereinafter, the procedure moves to step S805, and the description thereof will not be repeated.

On the other hand, in step S1518, if the CPU 101 determines that multiple SDRAMs have the third-lowest temperature, the procedure moves to step S1520, and the CPU 101 determines whether or not the state data exists in an SDRAM having the third-lowest temperature. Here, if it is determined that it does exist, the procedure moves to step S1521, and the CPU 101 reserves the address area of the SDRAM in which the state data exists, as a memory area to be used with priority. Thus, the CPU 101 decides on the SDRAM in which the state data exists, as the SDRAM to be used in the suspend mode. Thereafter, the procedure moves to step S807, and the description thereof will not be repeated.

In step S1520, if the CPU 101 determines that the state data does not exist in the SDRAMs having the third-lowest temperature, the procedure moves to step S1522, and the CPU 101 reserves the memory area in accordance with a pre-determined priority ranking, and thus decides on the SDRAM to be used in the suspend mode. The information indicating this priority ranking may be stored in the HDD 105 or the ROM 106 and acquired by the CPU 101. Thereafter, the procedure moves to step S806, and the description thereof will not be repeated.

In step S1517, if the CPU 101 determines that the memory area cannot be reserved, the procedure moves to step S1523, and the CPU 101 reserves the memory area in the address areas of the SDRAMs 301 to 304 having the lowest to fourth-lowest temperatures. Thereafter, the procedure moves to step S805, and since the processing from step S1524 onward is the same as described above, the description thereof will not be repeated.

Next, the processes will be described, in detail, using specific values of the acquired temperature information. In the present embodiment, the acquired temperature information is assumed to be values such as those shown in FIG. 19, and the description thereof will be given below. That, is to say, it is assumed that the temperature detected by the temperature sensor 309 is 50° C., the temperature detected by the temperature sensor 310 is 50° C., the temperature detected by the temperature sensor 311 is 65° C., and the temperature detected by the temperature sensor 312 is 70° C. Additionally, it is assumed that the addresses 0x0000_1000 is the amount of the memory area needed for the state data, and that the state data exists in the SDRAM 301.

Figure 15:
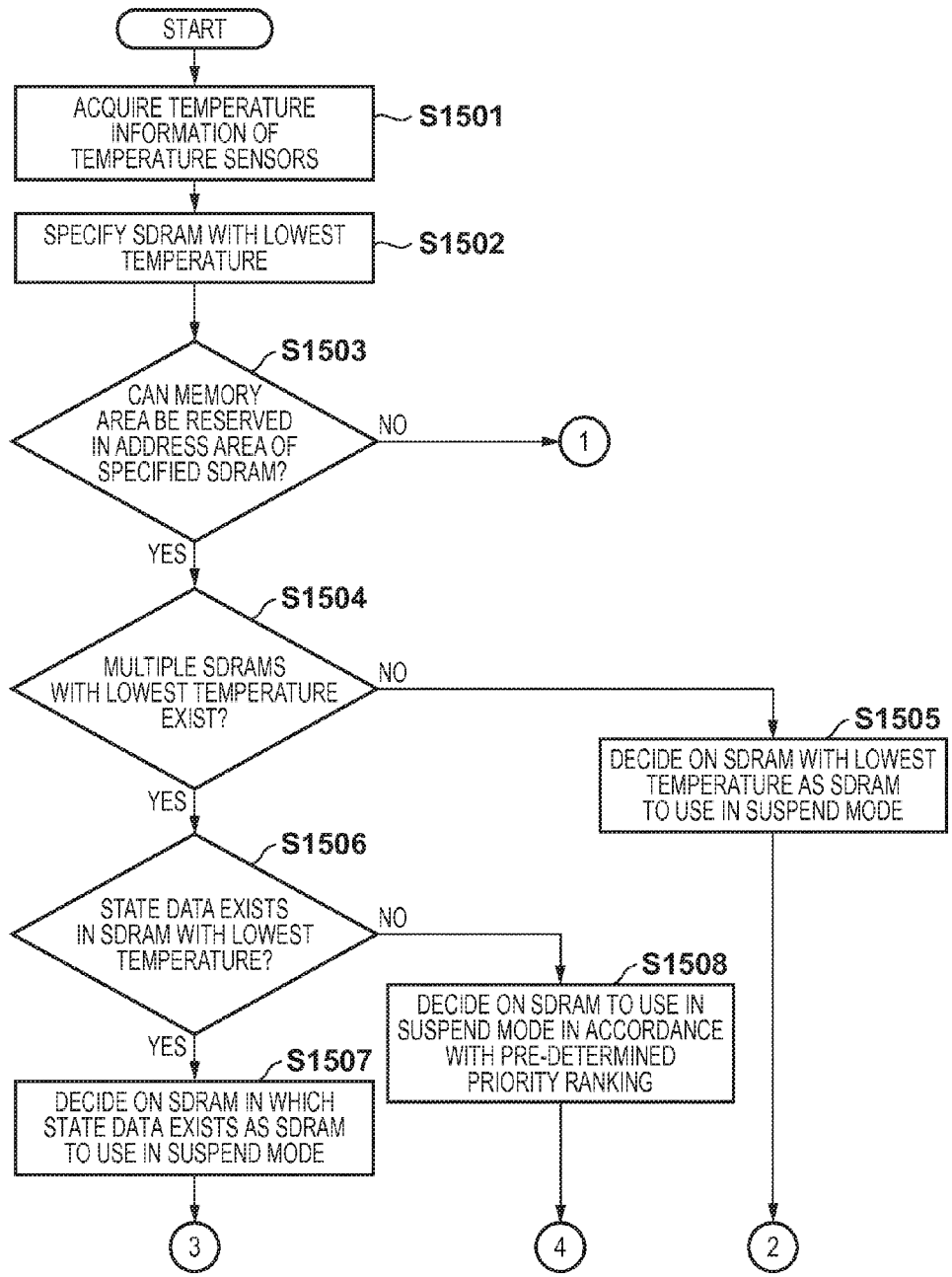
FIG. 15 is a flowchart for describing processing for deciding on an SDRAM to use in the case where the CPU of the MFP according to a third embodiment causes the MFP to transition to the suspend mode.

First, in step S1501 in FIG. 15, the CPU 101 acquires temperature information such as that shown in FIG. 19. Next, in step S1502, the CPU 101 determines that the SDRAMs with the lowest temperature are the SDRAMs 301 and 302. Next, in step S1503, the CPU 101 determines whether or not a memory area capable of storing the state data can be reserved in the areas with the addresses 0x0000_0000 to 0x4000_0000 allocated to the SDRAMs 301 and 302. Since the memory area can be reserved, and multiple SDRAMs, namely the SDRAMs 301 and 302, have the lowest temperature in the present, embodiment, the procedure moves to step S1506, and the CPU 101 determines whether or not the state data exists in the SDRAM 301 or 302. Since the state data exists in the SDRAM 301 in the present embodiment, the procedure moves to step S1507, and the CPU 101 reserves the memory area in the address area of the SDRAM 301 in which the state data exists. Then, the procedure moves to step S807 in FIG. 18, and the CPU stores the return reference information in the HDD 105, and in step S808, the CPU 101 stops the supply of power to the SDRAMs 302, 303, and 304. Furthermore, in step S809, the CPU 101 changes the operation mode of the SDRAM 301 to the self-refresh state.

Note that the method, used by the MFP 100 to return from the suspend mode to the normal mode is the same as that in the flowchart shown in FIG. 10, which was described above.

Also, as in the second embodiment, when deciding on the SDRAM to be used based on the heat generation amount of the SoC die 201, the processing may be similarly executed in the case where multiple areas have the same heat generation amount.

According to the present embodiment as described above, if multiple SDRAMs have the same temperature, or multiple areas have the same heat generation amount, the SDRAM in which the state data exists is decided on as the memory to be used in the suspend mode. Since the movement of state data in the memory space can be thus avoided, it is possible to reduce power consumption that accompanies the movement of data.

Fourth Embodiment

A fourth embodiment is conceivable in which the CPU 101 uses a timer (not shown) in the suspend mode to periodically select an SDRAM to be used in the suspend mode. The method of selecting the SDRAM to be used in the suspend mode can be executed with processing that is the same as that in the flowchart shown in FIGS. 8 and 14.

Thus, even if the temperature state of the SDRAM changes in the suspend mode, power consumption can be reduced by suppressing SDRAM temperature increases.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-227425, filed Oct. 12, 2012, which is hereby incorporated by reference herein in its entirety.

What is claimed is:

1. An information processing apparatus including a wide IO memory device stacked on an SoC die that includes a CPU, the information processing apparatus comprising:
    a temperature detection unit configured to detect temperatures of a plurality of memories that are included in the wide IO memory device;
    a specification unit configured to, at least in one case that the information processing apparatus transitions to a power saving state, specify a memory to save information to be used after the information processing apparatus recovers from the power saving state, wherein the memory having a lower temperature among the plurality of memories is specified based on the temperatures detected by the temperature detection unit; and
    a storage control unit configured to save the information to be used after the information processing apparatus recovers from the power saving state in the memory specified by the specification unit, wherein the information is saved in the specified memory before transition of the information processing apparatus to the power saving state.

2. The information processing apparatus according to claim 1, wherein when all of the information cannot be stored in one memory out of the plurality of memories, the specification unit further specifies a memory having a next-lowest temperature as a memory to save the information to be used after the information processing apparatus recovers from the power saving state.

3. The information processing apparatus according claim 1, wherein if a plurality of memories having a lowest temperature exist, the specification unit specifies a memory in which the information is already stored out of the plurality of memories having the lowest temperature, as a memory to save the information to be used after the information processing apparatus recovers from the power saving state.

4. The information processing apparatus according to claim 1, further comprising a control unit configured to, when the information processing apparatus transitions to the power saving state, set the memory specified by the specification unit to a self-refresh state, and stop a supply of power to each memory not specified by the specification unit.

5. The information processing apparatus according to claim 1, further comprising a storage unit configured to, when the information processing apparatus transitions to the power saving state, store return reference information regarding the memory in which the information was stored by the storage control unit.

6. The information processing apparatus according to claim 1, wherein the wide IO memory device is configured by a plurality of memory channels, and the plurality of memories are arranged in the plurality of memory channels.

7. The information processing apparatus according to claim 1,
    wherein each of the plurality of memories has a temperature sensor that detects temperature, and
    wherein the temperature detection unit detects each of the temperatures of the plurality of memories based on the temperature detected by the temperature sensor.

8. An information processing apparatus including a wide IO memory device stacked on an SoC die that includes a CPU, the information processing apparatus comprising:

a calculation unit configured to, at least in one case that the information processing apparatus transitions to a power saving state, calculate a heat generation amount generated in the power saving state in each of a plurality of areas that are obtained by dividing an area of the SoC die;

a specification unit configured to specify a memory positioned over an area in which the heat generation amount calculated by the calculation unit is smaller out of a plurality of memories included in the wide IO memory device, wherein the memory is specified for saving information to be used after the information processing apparatus recovers from the power saving state; and a storage control unit configured to save the information to be used after the information processing apparatus recovers from the power saving state in the memory specified by the specification unit, wherein the information is saved in the specified memory before transition of the information processing apparatus to the power saving state.

9. The information processing apparatus according to claim 8, wherein when all of the information cannot be stored in one memory out of the plurality of memories, the specification unit further specifies a memory positioned above an area having a next-smallest heat generation amount as a memory to save the information to be used after the information processing apparatus recovers from the power saving state.

10. The information processing apparatus according to claim 8, wherein if a plurality of areas having a smallest heat generation amount exist, the specification unit specifies a memory in which the information is already stored, out of a plurality of memories positioned above the plurality of areas having the smallest heat generation amount, as a memory to be used after the information processing apparatus recovers from the power saving state.

11. The information processing apparatus according to claim 8, further comprising a control unit configured to, when the information processing apparatus transitions to the power saving state, set the memory specified by the specification unit to a self-refresh state, and stop a supply of power to each memory not specified by the specification unit.

12. The information processing apparatus according to claim 8, further comprising a storage unit configured to, when the information processing apparatus transitions to the power saving state, store return reference information regarding the memory in which the information was stored by the storage control unit.

13. The information processing apparatus according to claim 8, wherein the wide IO memory device is configured by a plurality of memory channels, and the plurality of memories are arranged in the plurality of memory channels.

14. A control method of controlling an information processing apparatus including a wide IO memory device stacked on an SoC die that includes a CPU, the method comprising:

detecting temperatures of a plurality of memories that are included in the wide IO memory device;

specifying, at least in one case that the information processing apparatus transitions to a power saving state, a memory to save information to be used after the information processing apparatus recovers from the power saving state, wherein the memory having a lower temperature among the plurality of memories is specified based on the detected temperatures; and saving the information to be used after the information processing apparatus recovers from the power saving state in the specified memory, wherein the information is saved in the specified memory before transition of the information processing apparatus to the power saving state.

15. A control method of controlling an information processing apparatus including a wide IO memory device stacked on an SoC die that includes a CPU, the method comprising:

calculating, at least in one case that the information processing apparatus transitions to a power saving state, a heat generation amount generated in the power saving state in each of a plurality of areas that are obtained by dividing an area of the SoC die;

specifying a memory positioned over an area in which the calculated heat generation amount is smaller out of a plurality of memories included in the wide IO memory device, wherein the memory is specified for saving information to be used after the information processing apparatus recovers from the power saving state; and saving the information to be used after the information processing apparatus recovers from the power saving state in the specified memory, wherein the information is saved in the specified memory before transition of the information processing apparatus to the power saving state.

16. A non-transitory computer-readable storage medium storing a computer program for causing a computer to execute a control method of controlling an information processing apparatus including a wide IO memory device stacked on an SoC die that includes a CPU, the method comprising:

detecting temperatures of a plurality of memories that are included in the wide IO memory device;

specifying, at least in one case that the information processing apparatus transitions to a power saving state, a memory to save information to be used after the information processing apparatus recovers from the power saving state, wherein the memory having a lower temperature among the plurality of memories is specified based on the detected temperatures; and saving the information to be used after the information processing apparatus recovers from the power saving state in the specified memory, wherein the information is saved in the specified memory before transition of the information processing apparatus to the power saving state.

17. A non-transitory computer-readable storage medium storing a computer program for causing a computer to execute a control method of controlling an information processing apparatus including a wide IO memory device stacked on an SoC die that includes a CPU, the method comprising:

calculating, at least in one case that the information processing apparatus transitions to a power saving state, a heat generation amount generated in the power saving state in each of a plurality of areas that are obtained by dividing an area of the SoC die;

specifying a memory positioned over an area in which the calculated heat generation amount is smaller out of a plurality of memories included in the wide IO memory device, wherein the memory is specified for saving information to be used after the information processing apparatus recovers from the power saving state; and saving the information to be used after the information processing apparatus recovers from the power saving state in the specified memory, wherein the information is saved in the specified memory before transition of the information processing apparatus to the power saving state.

* * * * *